US012694670B2

(12) United States Patent　　　　　(10) Patent No.:　US 12,694,670 B2

Pallone et al.　　　　　　　　　　　　(45) Date of Patent:　　　Jul. 28, 2026

---

(54) OBJECT OUTLINE GENERATION FROM OVERHEAD IMAGERY USING ACTION SEQUENCE PREDICTION

(71) Applicant: Google LLC, Mountain View, CA (US)

(72) Inventors: Michelina Pallone, Boulder, CO (US); Yan Mayster, Mountain View, CA (US)

(73) Assignee: Google LLC, Mountain View, CA (US)

( * ) Notice: Subject to any disclaimer, the term of this patent is extended or adjusted under 35 U.S.C. 154(b) by 292 days.

(21) Appl. No.: 18/640,259

(22) Filed: Apr. 19, 2024

(65) Prior Publication Data

US 2025/0329160 A1　　Oct. 23, 2025

(51) Int. Cl.
| | |
|---|---|
| *G06V 20/10* | (2022.01) |
| *G06V 10/44* | (2022.01) |
| *G06V 10/774* | (2022.01) |
| *G06V 10/82* | (2022.01) |
| *G06V 10/94* | (2022.01) |
| *G06V 20/70* | (2022.01) |

(52) U.S. Cl.
CPC ........... *G06V 20/176* (2022.01); *G06V 10/44* (2022.01); *G06V 10/774* (2022.01); *G06V 10/82* (2022.01); *G06V 10/945* (2022.01); *G06V 20/70* (2022.01)

(58) Field of Classification Search
CPC .... G06V 20/176; G06V 10/44; G06V 10/774; G06V 10/82; G06V 10/945; G06V 20/70
See application file for complete search history.

(56) References Cited

U.S. PATENT DOCUMENTS

| | | | | |
|---|---|---|---|---|
| 10,007,867 | B2 * | 6/2018 | Yu | G06F 16/583 |
| 10,664,750 | B2 * | 5/2020 | Greene | G06Q 10/06 |
| 11,334,971 | B2 * | 5/2022 | Lin | G06V 10/82 |
| 11,347,976 | B2 * | 5/2022 | Okazaki | G06V 20/13 |
| 11,636,602 | B1 * | 4/2023 | Havír | G06V 10/774 |
| | | | | 382/164 |
| 2022/0415022 | A1 * | 12/2022 | Brumby | G06V 10/774 |
| 2023/0351620 | A1 * | 11/2023 | Ng | G06V 10/82 |
| 2023/0351728 | A1 * | 11/2023 | Shu | G06N 3/0455 |
| 2025/0217170 | A1 * | 7/2025 | Shaw | G06V 20/50 |

OTHER PUBLICATIONS

Le, Hoang, et al. "Interactive boundary prediction for object selection." Proceedings of the European Conference on Computer Vision (ECCV). 2018. (Year: 2018).*

(Continued)

*Primary Examiner* — Gregory A Morse
*Assistant Examiner* — Ronde Lee Miller
(74) *Attorney, Agent, or Firm* — IP Spring

(57) ABSTRACT

Some implementations relate to using a trained machine (ML) model to identify object boundaries from overhead imagery. The ML model may be trained by obtaining training data including overhead images of a scene and corresponding user input actions and being trained based on the training data. The ML model obtains overhead imagery that depicts a plurality of objects having an unknown object boundary. The trained ML model generates predicted sequences of user input actions associated with object boundaries of the plurality of objects in the overhead imagery. Object boundaries of the plurality of objects are determined based on the predicted sequences of user input actions.

20 Claims, 13 Drawing Sheets

(56) References Cited

OTHER PUBLICATIONS

Bhattacharyya, Apratim, et al. "Long-term image boundary prediction." Proceedings of the AAAI Conference on Artificial Intelligence. vol. 32. No. 1. 2018. (Year: 2018).*

Kaminsky, Ryan S., et al. "Alignment of 3D point clouds to overhead images." 2009 IEEE computer society conference on computer vision and pattern recognition workshops. IEEE, 2009. (Year: 2009).*

Chen, Ting, Saurabh Saxena, Lala Li, David J. Fleet, and Geoffrey Hinton. "Pix2seq: A language modeling framework for object detection." arXiv preprint arXiv:2109.10852 (2021)., 17 pages.

"Pix2Seq: A New Language Interface for Object Detection", available at https://blog.research.google/2022/04/pix2seq-new-language-interface-for.html, accessed on Dec. 9, 2023, 7 pages.

* cited by examiner

100

200

210

220

300

320

310

—— Tile with Margin

- - - Tile Border

—·—·— Detected Outlines with Overlap

500a

500b

600

800b

900

OBJECT OUTLINE GENERATION FROM OVERHEAD IMAGERY USING ACTION SEQUENCE PREDICTION

TECHNICAL FIELD

Implementations relate generally to object outline generation, and in particular to object outline generation from overhead imagery using sequence of user actions prediction techniques.

BACKGROUND

Digital maps use satellite and other overhead imagery to generate outlines of objects, such as buildings, roads, etc. Identifying and illustrating object outlines from such imagery presents significant challenges. Automatically generated object outlines sometimes fail to capture details such as protrusions, gaps, or shape irregularities. Manual interpretation is often necessary to distinguish the object shapes, e.g., in densely constructed areas.

However, manual annotation is costly and not scalable. Current automated techniques sometimes fail to capture the precise geometry of objects. For example, an object shape may be approximated by a rectangle or simple shape even when the actual object has protrusions or other deviations from a simple shape. Such errors can have an adverse effect on the quality of 2D and 3D map representations of buildings and other objects. The errors may impact visual quality as well as the functional use of digital maps in various applications such as navigation, 2.5/3D view, urban planning, shopping, etc.

Some implementations were conceived in light of the above.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

Implementations of this application relate to object outline generation from overhead imagery using a sequence of user actions prediction. For example, a machine learning (ML) model is trained to predict a sequence of user actions. The user actions may be clicks (or other suitable inputs) made by a human operator when annotating an object outline (such as a building outline) in an overhead image from overhead images in a training dataset. The trained model is to generate accurate object outlines for arbitrary new images.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

According to one aspect, there is provided a computer-implemented method to use a trained machine learning (ML) model to identify object boundaries from overhead imagery, the method comprising: obtaining overhead imagery that depicts a plurality of objects having at least one unknown object boundary; generating, by the trained ML model, predicted sequences of user input actions associated with object boundaries of the plurality of objects in the overhead imagery; and determining the object boundaries of the plurality of objects based on the predicted sequences of user input actions.

Various implementations of the computer-implemented method are described herein.

In some implementations, individual images in the overhead imagery correspond to tiles for a map, each tile with associated coordinates, and the computer-implemented method further comprising: stitching together at least two tiles to form a portion of the map.

In some implementations, the tiles overlap or there are gaps between tiles, and the stitching corrects for the overlap or the gaps.

In some implementations, the computer-implemented method further comprises identifying adjacent tiles based on the coordinates, and stitching together two or more of the tiles comprises: detecting whether there is at least one non-matching tile boundary between the adjacent tiles; and in response to detecting that there is at least one non-matching tile boundary between the adjacent tiles, performing at least one of: generating the predicted sequences conditioned on individual tiles, generating the predicted sequences conditioned on a group of adjacent tiles, or flagging at least one tile of the adjacent tiles for review or update.

In some implementations, stitching together the at least two tiles comprises applying heuristics to determine object boundaries for each tile of the at least two tiles.

In some implementations, stitching together the at least two tiles comprises at least one of identifying holes in objects in a particular tile of the at least two tiles and identifying objects that span multiple tiles of the least two tiles.

In some implementations, at least one unknown object boundary is an object boundary having a respective confidence score less than a threshold value.

In some implementations, the overhead imagery comprises at least one of objects with fully unknown boundaries or objects with approximated boundaries having a confidence score less than threshold value used as input for the predicting.

In some implementations, the trained ML model outputs a sequence of object descriptions including coordinates of endpoints of boundary segments and class labels associated with portions of the objects to define the object boundaries.

In some implementations, individual overhead images in the overhead imagery may be associated with an overhead imagery angle used to associate object boundaries with dimensionality greater than two-dimensional (2D) dimensionality.

In some implementations, the trained ML model is trained by: obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects; generating for each sample, by the ML model and based on the overhead imagery, a set of predicted user input actions for the overhead image; calculating, for each sample, a respective value of a loss function based on a comparison of the set of user input actions in the sample and the set of predicted user input actions; and updating one or more parameters of the ML model based on the values of the loss function.

According to another aspect, there is provided a computer-implemented method to train a machine learning (ML) model to identify object boundaries from overhead imagery, the method comprising: obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects; generating for each sample, by the ML model and based on the overhead imagery, a set of predicted user input actions for the overhead image; calculating, for each sample, a respective value of a loss function based on a comparison of the set of user input actions in the sample and the set of predicted user input actions; and updating one or more parameters of the ML model based on the values of the loss function.

Various implementations of the computer-implemented method are described herein.

In some implementations, the ML model is a neural network and updating the one or more parameters of the ML model based on the values of the loss function comprises one or more of automatically adjusting a weight of one or nodes of the neural network or automatically adjusting connectivity between one or more pairs of nodes of the neural network.

In some implementations, individual overhead images in the training dataset correspond to tiles for a map, each tile with associated coordinates, and the tiles are stitched together to form the map.

In some implementations, user input actions in the set of user input actions comprise clicks made by at least one user on individual overhead images in the training dataset and one or more click locations associated with the clicks correspond to a point on the object boundaries.

According to another aspect, there is provided a computing device comprising: a processor; and a memory with instructions stored thereon that, when executed by the processor cause the processor to perform operations to identify object boundaries from overhead imagery using a trained machine learning (ML) model, the operations comprising: obtaining overhead imagery showing a plurality of objects having at least one unknown object boundary; generating, by the trained ML model, predicted sequences of user input actions associated with object boundaries of the plurality of objects shown in the overhead imagery; and determining the object boundaries of the plurality of objects based on the predicted sequences of user input actions.

Various implementations of the computing device are described herein.

In some implementations, individual images in the overhead imagery correspond to tiles for a map, each tile with associated coordinates, and the operations further comprising: stitching together at least two tiles to form a portion of the map.

In some implementations, the trained ML model outputs a sequence of object descriptions including coordinates of endpoints of boundary segments and class labels associated with portions of the objects that define the object boundaries.

In some implementations, individual overhead images in the overhead imagery may be associated with an overhead imagery angle used to associate object boundaries with dimensionality greater than two-dimensional (2D) dimensionality.

In some implementations, the trained ML model is trained by: obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects; generating for each sample, by the ML model and based on the overhead imagery, a set of predicted user input actions for the overhead image; calculating, for each sample, a respective value of a loss function based on a comparison of the set of user input actions in the sample and the set of predicted user input actions; and updating one or more parameters of the ML model based on the values of the loss function.

According to yet another aspect, portions, features, and implementation details of the computing devices, methods, and other implementations including systems and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
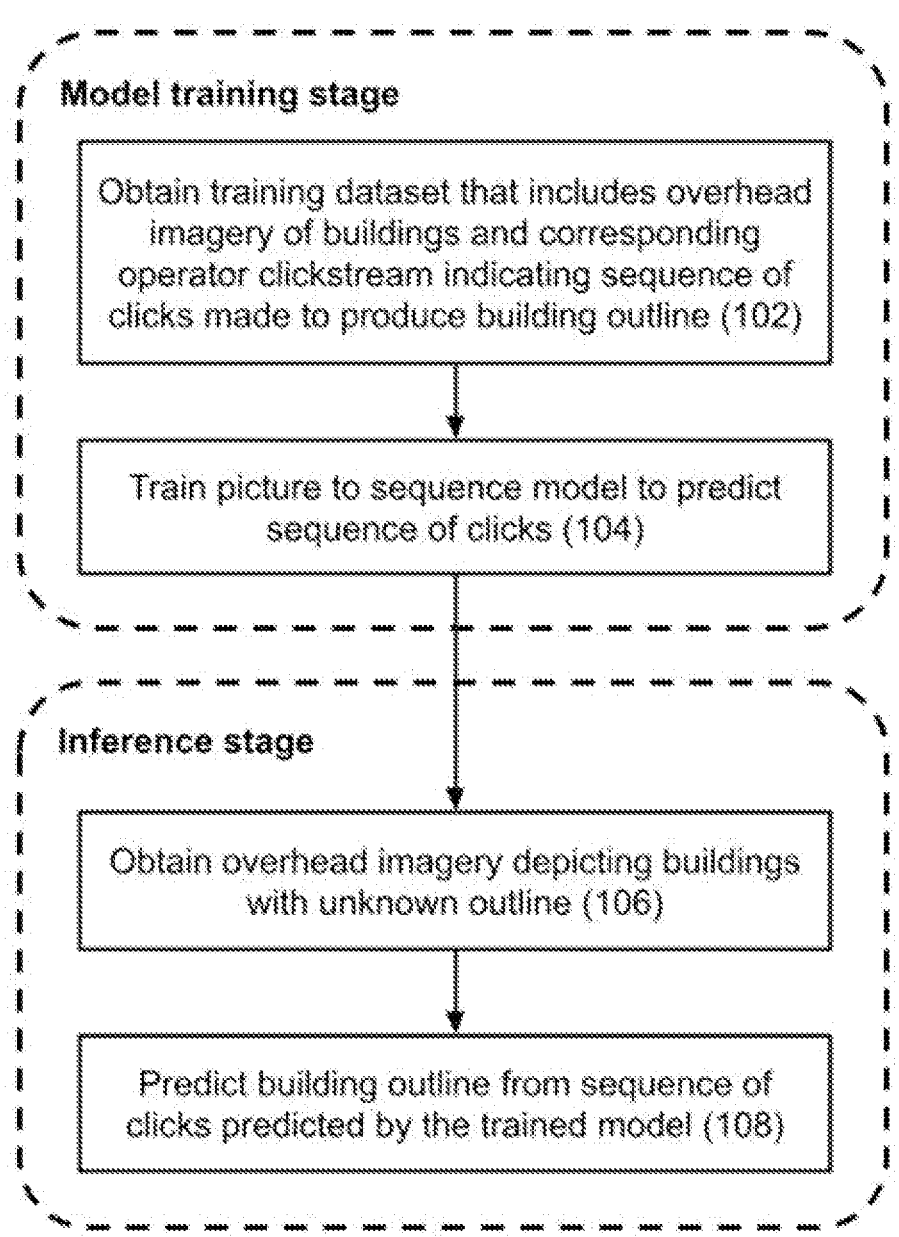
FIG. 1 is a diagram illustrating an example process to train a machine learning model and to utilize the machine learning model for inference, in accordance with some implementations.

Described features provide techniques to improve automated recognition of outlines of objects, such as buildings, roads, etc. from overhead imagery. Various implementations described herein use machine learning techniques, similar to language modeling, that automatically generate object outlines from overhead imagery. In some implementations, a model is trained to predict a sequence of user input actions (e.g., clicks made by a human operator when annotating a building outline in an overhead image) for images in a training dataset. While some implementations identify object outlines or object boundaries, the techniques described herein may have broad applications, such as for object geometry. For example, these techniques could be used to generate a centerline of a sidewalk or a single point location for an entrance.

Once trained, the trained model is usable to automatically generate object outlines for arbitrary new images, e.g., of the same or similar class (e.g., overhead imagery) as images in the training dataset. Such automatically generated object outlines have high accuracy. Using outlines with high accuracy can improve the usability of digital maps, including for applications such as navigation, 3D views, urban planning, etc.

Machine learning techniques described herein involve building, training, and applying machine learning models. The machine learning models are trained to describe objects by grounding the descriptions on pixel observations, leading to useful object representations. Such models can output a sequence of object boundary descriptions from an arbitrary input image.

In some implementations, an object boundary description may be described using five discrete tokens: coordinates of the corners of the boundary description $(y_{min}, x_{min}, y_{max}, x_{max})$ and a class label. For example, some models may identify bounding boxes associated with labels. However, in some implementations, the coordinates may be adapted to identify starting points and ending points of line segments or otherwise manage sequences of points that, when connected, define object boundaries.

In some implementations, a pre-trained picture to sequence model may be adapted for object recognition with additional training. In some implementations, an object boundary description is a line segment connecting a first endpoint $(x_{min}, y_{min})$ to the second endpoint $(x_{max}, y_{max})$. Alternatively, the coordinates could correspond to a first ordered pair (x, y) followed by a second ordered pair (x, y) in an order corresponding to points in the outline. The label indicates the object that a given line segment is modeling a boundary of. In some implementations, the label may additionally indicate information about which part of a boundary of a given object a given label provides (which order) or if a portion of a boundary is a straight line segment or if the boundary includes a curvature (or another shape).

Various implementations provide techniques to use machine learning models to automatically identify outlines of structures, e.g., buildings, roads, or other man-made or natural objects, based on overhead imagery. In some implementations, the input to the model includes images (e.g., captured with an overhead camera such as a satellite-based camera, a drone camera, a camera on an aircraft or balloon, or any other overhead camera) and the output of the model includes output sequences of user actions (e.g., clicks or other selection actions) corresponding to boundaries of objects in the image. The sequences of user actions corresponding to boundaries can be interpreted and applied as an ordered sequence of points that define an identified boundary of a given object.

Various implementations provide several technical benefits. In comparison to existing approaches to automatically identify boundaries of objects from overhead imagery that only provide rough approximations of such boundaries, the implementations generate accurate object boundaries. In prior techniques, manual annotations are often necessary to distinguish shapes to distinguish fine details of shapes, such as irregularities, large objects, holes in buildings, and overlaps.

To address such limitations, implementations train a machine learning (ML) model to predict object boundaries for objects in one or more input images. Such a ML model is trained based on a training set of images and associated sequences of user input actions (such as clicks at recorded locations of the images) that capture manual annotations for the images. In some implementations, line segments connect the succession of clicks to indicate the manually annotated groundtruth boundaries. Once the ML model is trained, the ML model can receive arbitrary images (and optionally, rough approximations of outlines of objects) as input, and generate as output sequences of points (e.g., identified by predicted input actions) that define object boundaries in the input images.

A trained ML model as described herein is able to provide high quality recognition of object boundaries automatically based on past patterns of annotation, obviating the need for expensive and time-consuming manual annotation on an ongoing basis. The machine learning model may be trained using training data that specifically includes a sufficient quantity of training examples (such as 200,000 training examples) including overhead images and corresponding manually annotated object boundaries.

Digital maps can extend to the entire globe and include a very large number of, e.g., millions of tiles. As the physical world changes, e.g., new roads, buildings, and other structures are constructed; current structures are demolished or modified; etc., it is important to update a digital map to keep the information current. A technical problem when updating a digital map that includes digital representations of physical objects in a tile using overhead imagery is to identify objects accurately and efficiently in the imagery.

Manual update is not scalable when the digital map is very large and is also very expensive. Manual review of images to annotate objects also requires significant computational resources to display images, and to receive and store manual annotations. Prior automated techniques lack accuracy, may not identify certain types of objects, and require substantial manual input. For example, rule-based techniques may not identify object boundaries for objects that do not match the preconfigured rules. Heuristics techniques may not identify object boundaries for objects that do not meet the heuristics. Further, building rules and heuristics on the scale of a global digital map (or even for a smaller geographic region) can be prohibitively expensive. For example, for structures of arbitrary shapes, heuristics or rule-based techniques may generate relatively crude boundaries, e.g., straight-line boundaries, that do not take into account protrusions, gaps, curvatures, or other irregularities in the object boundary.

Various implementations described herein have several technical benefits. Training the machine learning model to identify object boundaries can be performed using a representative training dataset that includes overhead imagery that captures different varieties (object type, object size, and other attributes) of objects, without having to manually encode rules or heuristics. Instead, by training the model using a set of images with corresponding manual annotations, the model is automatically configured to recognize object boundaries. Further, since pre-stored manual annotations (e.g., from previously annotated imagery) is reused, little or no computational resources are required to generate the training dataset.

Still further, in implementations where a pre-trained machine learning model (e.g., a picture to sequence model) is fine-tuned to train it to generate object boundaries from overhead imagery, the training dataset can be smaller, sufficient to adapt the model to the domain of annotating overhead imagery. With a smaller training dataset, the computational resources required for training the model are lower.

The provided approach enables implementations to model map schema more closely so the output of the model is more directly usable. In the past, approaches had a longer chain of models and heuristics, each with quality loss along the way (e.g., first predicting which pixels are buildings, then heuristic vectorizers, then heuristics filters etc.) Thus, even if each step of the old system had somewhat good results, the failures could compound into a low quality end to end performance.

The generalist framework of using the language inspired modeling means that it is easy to extend the approach to new categories and tasks (if implementations have training data). Implementations just have to add some new tokens to the vocabulary.

Further, once trained, the trained model can automatically generate object boundaries (or other annotations) for arbitrary overhead imagery. The trained model can also receive additional conditioning inputs (e.g., annotations for neighboring tiles, annotations for a prior version of the tile, etc.) that enable the model output to accurately identify object boundaries for any type of object. The model can be deployed as newer overhead imagery becomes available and can generate updated object boundaries that can be used to update a digital map, with little to no manual effort. Further, since each tile (or a set of adjacent tiles) can be analyzed by the model independent of other tiles, the ML model can process a large number of tiles in parallel, thus allowing efficient computation (e.g., using a GPU, a machine learning processor, or other special purpose processor) and rapid generation of results.

FIG. 1—Training and Applying Machine Learning Model

FIG. 1 is a diagram 100 illustrating a process for training a machine learning model and using the machine learning model for inference, in accordance with some implementations.

The process illustrated in diagram 100 includes two phases: a model training stage (including block 102 and block 104) and an inference stage (including block 106 and block 108). In the model training stage, a machine learning model is trained to adjust its parameters such that it can accurately output object boundaries for objects in an arbitrary input image. A training dataset that includes a plurality of input images (e.g., overhead imagery of the earth) and user input actions that define object boundaries in each image is provided. In the inference stage, the trained machine learning model takes as input new overhead imagery. In the inference stage, the trained machine learning model is utilized to infer predicted sequences of input actions that are associated with the imagery. The predicted sequences provide information that defines object boundaries.

The model training stage may begin at block 102. At block 102, a training dataset is obtained that includes overhead imagery of buildings and corresponding operator clickstreams indicating sequences of clicks made to indicate building outlines. While block 102 discusses obtaining imagery of buildings, the overhead imagery can include other objects other than buildings, such as a man-made object, a road, or a natural object.

For example, the overhead imagery may be obtained from satellite photography or other sources of overhead imagery. In some implementations overhead imagery may be obtained from cameras mounted in an aerial vehicle, such as a drone, balloon, airplane, helicopter, etc. While block 102 discusses the use of operator clickstreams, other types of user input actions could define the groundtruth values of object boundaries. For example, the user may use a click and drag input to draw a line segment. Alternatively, the user input actions may involve use of a touch screen or the provision of numerical data that identifies boundary points or boundary line segments for the objects. Further, as a user provides user input action to define boundary information, a user may provide attribute information, such as class label input and other metadata associated with the boundary points or line segments. Block 102 may be followed by block 104.

At block 104, a machine learning model, e.g., a picture to sequence model (that is configured to generate sequences from pictures) is trained to predict a series of clicks. While block 104 characterizes the model as a picture to sequence model, any suitable form of machine learning model may be used. With the availability labeled training data is available (e.g., from prior human annotations), the model may be trained using supervised learning. The model may begin as a general machine vision model that is pre-trained on large quantities of data. As noted, block 104 illustrates the model generating a prediction of clicks, but other user input actions that indicate information about object boundaries may be used instead of or in addition to clicks in various implementations. In some implementations, training may be performed in training epochs, with each epoch including the model parameters being adjusted based on a set of input labeled data (input images and corresponding groundtruth data of user clicks obtained from user actions to annotate objects in the input images). In some implementations, the training stage may be over when one or more stopping criteria are met. Such criteria may include, for example, all training data being exhausted; model performance between consecutive epochs (or a set of consecutive epochs) changing by less than a threshold (low rate of improvement); model parameter values between consecutive epochs (or a set of consecutive epochs) changing by less than a threshold; computational budget for training being exhausted; or other criteria.

Since the model is to be applied in a particular context (generating object boundaries for objects in overhead imagery, e.g., for use in a digital map), the model may be trained on specific examples (for example, 200,000 specific examples) in which overhead images are associated with series of user actions (such as clicks) that identify object boundaries with improved accuracy. After block 104, the model training state is complete, and the model is ready for use. However, in some implementations, the model may be trained further if additional training data is available or if more training epochs are appropriate. Block 104 may be followed by block 106.

At block 106, the inference stage begins. Specifically, at block 106, overhead imagery depicting buildings with unknown outlines is obtained. While block 106 characterizes the objects with unknown outlines as buildings, in other implementations, the objects with unknown outlines may be any structures, man-made objects, roads, or natural objects, as non-limiting examples.

Throughout the disclosure outlines and boundaries are used as having similar meanings, in order to refer to the shape on an overhead image that corresponds with an exterior of a footprint of a building or another object in an actual environment. As discussed below, objects may also include holes or gaps in their interiors and some implementations may provide ways to identify such holes.

Unknown outlines may have different meanings in different implementations. In some implementations, unknown outlines may mean that the only available information is the imagery itself. In such a case, the only information available is the actual pixel coloration (or grayscale/monochrome information) in the image and the task for ML model is to find object boundaries without any other information as a starting point.

In some implementations, unknown outlines may mean that the outline information is approximate or rough. For example, in such implementations, the outlines may be approximated by a simple polygon that does not match all of the features of an actual outline of an object. In such a situation, it is known that the approximate outline is not fully accurate, but the approximate outline may inform the determination of the actual outline, e.g., by being provided to the model as a conditioning input.

In still other implementations, unknown outlines may mean that some outline information is available, but the outline information is associated with a confidence score and the confidence score is less than a threshold value. For example, there may be an approximate outline having a certain confidence score, and the ML model may be used to infer an accurate outline with the objective of obtaining the outline with a confidence score that is equal to or greater than a threshold value. Block 106 may be followed by block 108.

At block 108, a building outline is predicted from a sequence of clicks predicted by the trained model. For example, the trained model may be trained to receive an image from a set of images showing overhead imagery. Hence, the ML model generates a sequence of smaller objects corresponding to the edges of larger objects. The generated objects may define points and line segments, which when combined in order, define a boundary of an object with high accuracy.

In some implementations, a sequence includes coordinates defining two coordinates (two values of ordered pairs (x, y)) and corresponding labels. Thus, each coordinate may define an endpoint of a line segment and each label may clarify how the line segments are to be combined to define object boundaries, so that the sequences, when combined, trace outlines of multiple objects in the imagery. The coordinates and labels correspond to clicks or other appropriate points and/or edges that establish a boundary of an object.

After block 108, the inference stage is complete. In some implementations, the inference stage may be followed by a post-processing process involving operations such as stitching. For example, the imagery received in block 106 may include a plurality of tiles that together form a map. Hence, if each tile is processed separately in block 108, it may be necessary to stitch tiles together to fix issues from individual tiles and ensure that the results of processing individual tiles are combined in an appropriate manner. For example, a building may have a hole in its interior, may span multiple tiles, or there may be issues with overlap, gaps, or mismatch that are to be addressed prior to the tiles and outlines being usable to render a digital map. Other objects identified in individual tiles may present various issues that are resolved during post-processing by performing stitching. Additional details about stitching are provided in FIGS. 4 and 8A-8B.

Another aspect of the post-processing is the management of dimensionality. For example, the individual input image may be associated with an overhead imagery angle used to associate object boundaries with two-dimensional (2D) dimensionality, or with dimensionality greater than 2D dimensionality. For example, there may be 2D dimensionality, in which images are directly above objects, and the outlines show boundaries of objects.

However, based on an overhead imagery angle, there may also be a 2.5D dimensionality (which may show an extruded roof of a building), a 2.75D dimensionality (which may show a multi-height roof of a building), a 2.9D dimensionality (which may show a sloped roof of a building), or a 3D dimensionality (which may show overhangs and/or small details of a roof of a building). Such dimensionality may be addressed using techniques such as roof segment clustering, normal estimation, meshing, and regularization.

In various implementations, a digital map may be divided into regions, referred to herein as tiles. A tile may be associated with respective unique coordinates. By rendering a plurality of adjacent tiles, a digital map of a particular physical part of the earth can be displayed. An overhead image that is used to train the model or input to the model corresponds to a single tile.

Figure 2:
FIG. 2 is a diagram illustrating example building boundaries in a region based on initial approximations and based on inferences, in accordance with some implementations.

FIG. 2—Building Boundaries Including Original and Improved Boundaries

FIG. 2 is a diagram 200 illustrating building boundaries in a region based on initial approximations and based on inferences, in accordance with some implementations. FIG. 2 illustrates an initial set of building outlines 210 and a corrected set of building outlines 220. Both the initial set of building outlines 210 and the corrected set of building outlines 220 include twelve boundaries of buildings. While these examples are shown with respect to building outlines, similar principles apply to outlines for other identified objects in overhead imagery.

For example, the initial set of building outlines 210 includes a row of five buildings at the top of the image, another row of five buildings at the bottom of the image, and two buildings between these rows on the right extreme of the image. The corrected set of building outlines 220 includes a similar distribution of buildings. However, the buildings in the initial set of building outlines 210 only have approximate boundaries. Such approximate boundaries are only quadrilaterals or L-shaped polygons. The buildings in the corrected set of building outlines 220 include much more detailed boundaries. While the corrected set of building outlines 220 has boundaries that are similar to the building outlines 210, the corrected set of building outlines 220 includes more detail that cause the outlines in the corrected set of building outlines 220 to be closer to the actual building outlines in the physical world.

As seen in the initial set of building outlines 210, alternative techniques that do not use machine learning based sequences of clicks (or other sequences of user actions) prediction as described herein for prediction generate simple shapes as building outlines. As seen in the initial set of building outlines 210, protrusions and other deviations from simple outlines (simple shapes) are not captured in the building outlines. The corrected set of building outlines 220 illustrates building outlines generated using the techniques described for some implementations. As seen in the corrected set of building outlines 220, for the same buildings, higher resolution and more detailed outlines that capture protrusions and deviations are generated.

Figure 3:
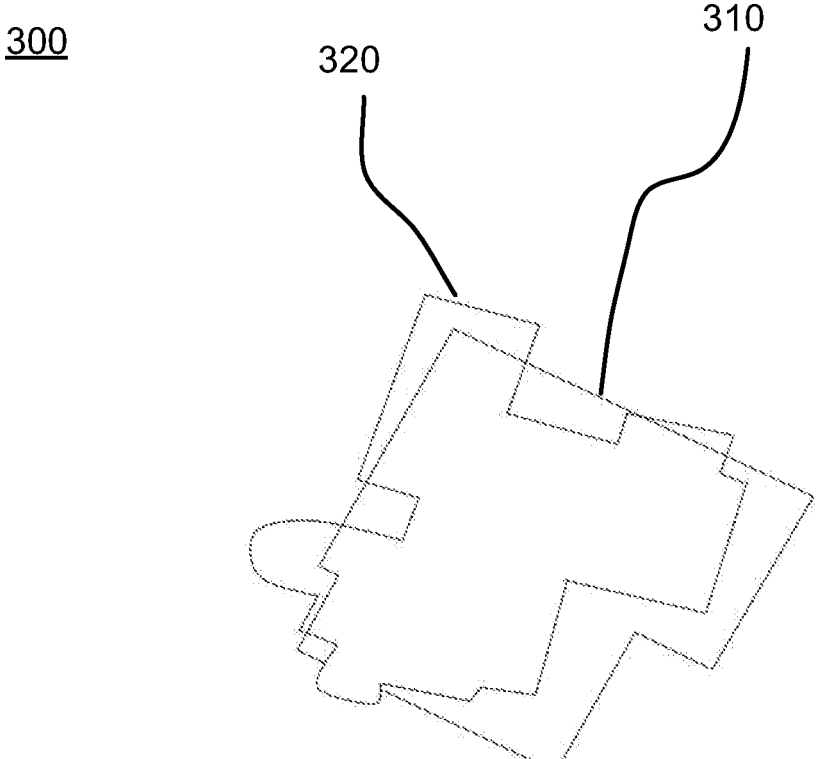
FIG. 3 is a diagram illustrating an example initial building boundary and an inferred building boundary, in accordance with some implementations.

FIG. 3—Initial and Inferred Building Boundary

FIG. 3 is a diagram 300 illustrating an example initial building boundary and an inferred building boundary, in accordance with some implementations. FIG. 3 illustrates two building outlines for the same building. The initial outline 310 illustrates an initial outline and the improved outline 320 illustrates the outline obtained via a trained model using the implementations described with reference to FIG. 1. As seen in FIG. 3, the trained model captures the rounded shape of the building at its left side, as well as protrusions at the bottom left. The outline generated by the trained model also illustrates gaps between different parts of the building, while the initial outline 310 does not include such detail.

The model can be trained from any source of overhead imagery, e.g., satellite images, or photographs taken by an aerial vehicle such as a drone, balloon, airplane, helicopter, as non-limiting examples and corresponding operator clickstreams (or other user actions that define object boundaries). The trained model can generate high accuracy outlines automatically. The described techniques can reduce human effort in generating building outlines, are scalable, and provide high quality building outlines that can improve the usability of digital maps, e.g., for navigation, 3D views, urban planning, etc. FIG. 3 shows that using techniques described herein to produce results such as the improved outline 320 in lieu of the initial outline 310 can obtain information that better agrees with the actual location and shape of objects in the real world, which is advantageous when working with such improved information.

Figure 4:
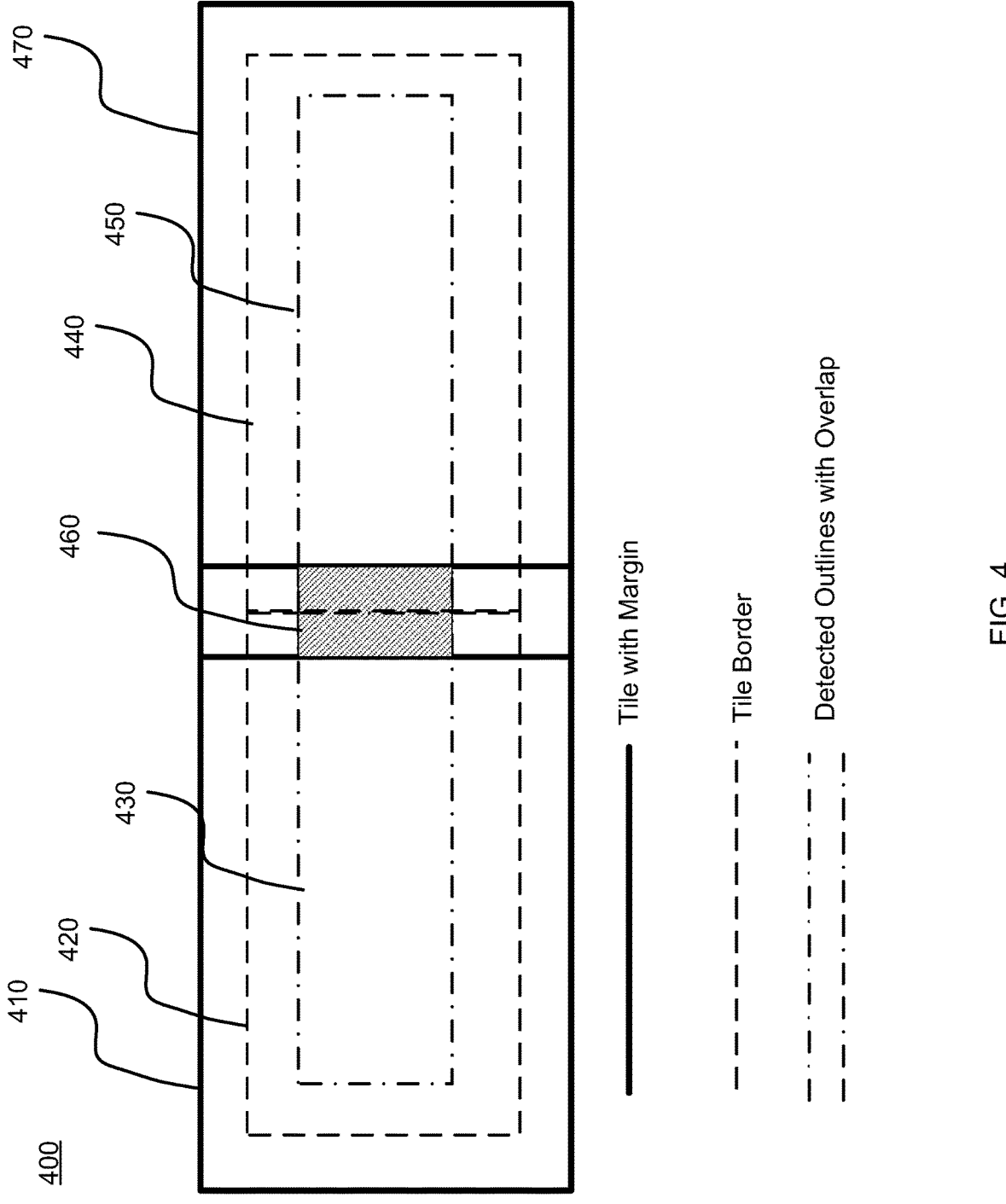
FIG. 4 is a block diagram illustrating overlapping tiles, in accordance with some implementations.

FIG. 4—Overlapping Tiles

FIG. 4 is a block diagram 400 illustrating overlapping tiles, in accordance with some implementations. In the example of FIG. 4, there are two tiles—a first tile with tile border 420 and a second tile with tile border 440. These two tiles have outer margins defined as tile margin 410 and tile margin 470 respectively. These two tiles illustrate a left portion of a detected object in the first tile having a detected outline with overlap 430 and a right portion of a detected object in the second tile having a detected outline with overlap 450. There is an overlap area 460 and the detected object has its left boundary derived from the detected outline with overlap 430 and its right boundary derived from the detected outline with overlap 450. Thus, FIG. 4 illustrates an example establishing how separate tiles overlap and together define a unified object. FIG. 4 also illustrates an example of how the entirety of an object may not be present in a single tile, and a tile edge may indicate that a given object extends into adjacent tiles.

Specifically, the two tiles each show part of an object, where the object has an overlap region and other parts of the object (such as corresponding edges) align. By identifying the matching and the overlapping, FIG. 4 shows an example of how objects spanning multiple tiles may be identified and unified into a single object that spans multiple tiles. Stitching may exclude some cases in which margins that do not coincide enough to satisfy a threshold or if interlocking patterns indicate that stitching is inappropriate. For example, constraints on the shapes, closeness to margin edge, and amount of area in the margin shared between fragments may be a factor in deciding whether fragments from two adjacent tiles are stitched together.

Figure 5A:
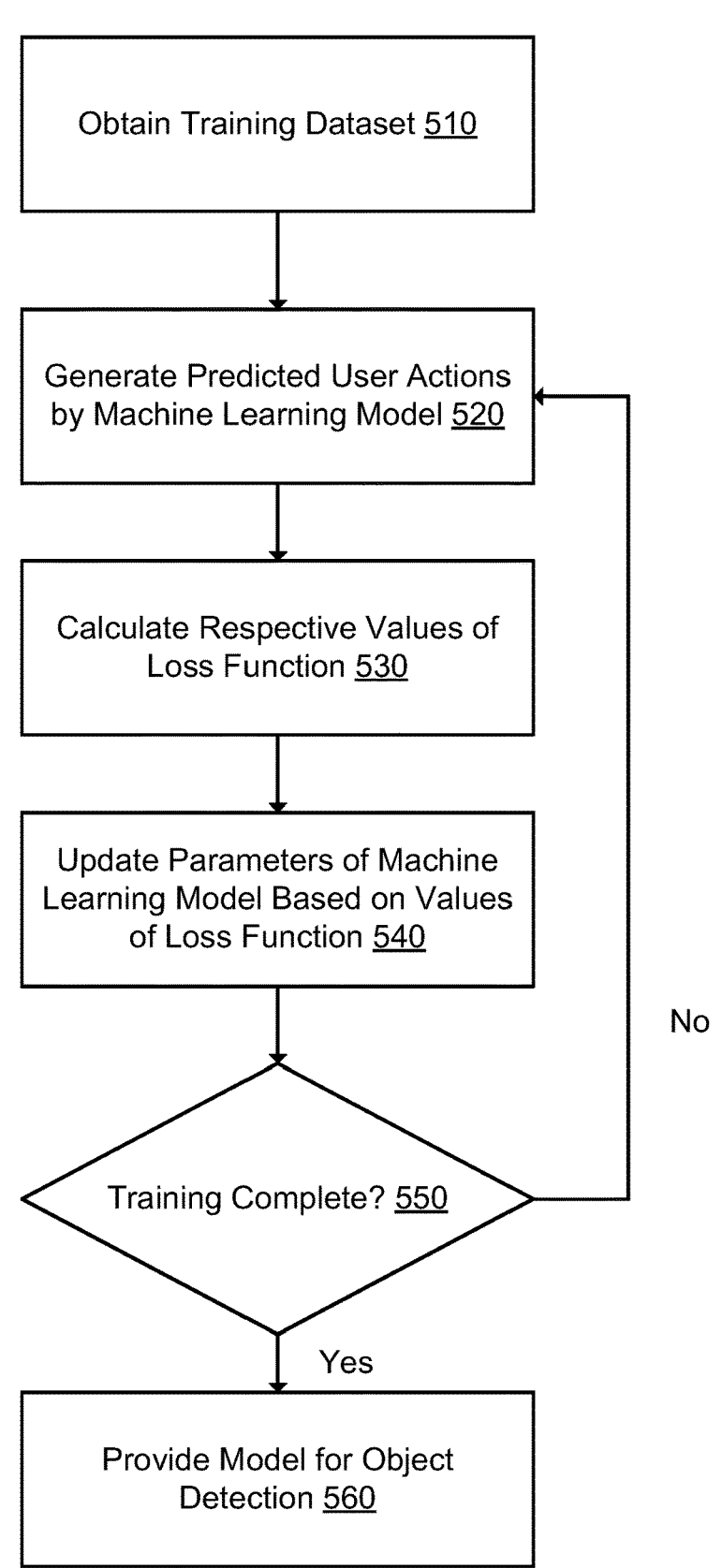
FIG. 5A is a flowchart of an example method to train a machine learning model, in accordance with some implementations.

FIG. 5A—Training Machine Learning Model

FIG. 5A is a flowchart of a method 500a to train a machine learning model, in accordance with some implementations. Method 500a may begin at block 510.

At block 510, a training dataset may be obtained. For example, the training dataset may include a plurality of images and associated groundtruth values of series of user actions, such as clicks in clickstreams. However, the user actions are not limited to clicks in clickstreams and may be provided through a variety of input devices such as mice, trackballs, touchscreens, keyboards, voice inputs, and so on as non-limiting examples. In general, the user actions are user actions that provide additional details about boundaries of objects in the plurality of images. In some implementations, the images may include historical map data.

The plurality of images may each be an overhead picture of a region. The images may be bitmapped pictures. In some implementations, the images are color images. For example, color images may encode colors of individual pixels in an image. Each pixel may have a red-green-blue value (RGB). For example, a pixel could have 8 bits for red, 8 bits for green, and 8 bits for blue and each of the R, G, and B values may have a value from 0 to 255. However, the images may also be grayscale or monochrome pictures.

Such images may be stored in a variety of formats, such as raster formats (where the picture is stored as a bitmap). Examples of possible raster formats are Joint Photographic Experts Group (JPEG or JPG), Portable Network Graphics (PNG), Graphics Interchange Format (GIF), and Tagged Image File Format (TIFF) formats. It may be possible to use information from various vector graphics formats, but the overhead images are generally be acquired or stored using a raster file. If the graphics are stored using vector graphics formats, they may be converted to raster graphics to be more suitable for subsequent processing, in that the models expect pixel data as input. Block 510 may be followed by block 520.

At block 520, predicted user actions may be generated by a machine learning model. For example, the machine learning model may be a picture to sequence model, and may generate corresponding sequences of predicted user actions. In some implementations, segmentation models could output rasters or output detection models could output boxes. However, other types of machine learning models are also possible, such as various other types of neural networks and deep learning and other forms of supervised learning. Here, the pictures are overhead images of regions, which may be of various origins, as received in block 510. Such regions may include objects whose boundaries are to be identified. When making the predictions, the machine learning model takes as inputs the pictures (such as the relevant bitmaps) and provides as outputs at least one object edge description.

For example, an object edge description may include an x-coordinate and a y-coordinate for opposite ends of a line segment defining a portion of a boundary the object, as well as an object label. The object label provides information that clarifies which object in the picture the edge pertains to as well as where in the boundary of the object the edge is located. The object label may also include additional data about the boundary, such as whether it is straight or curved. These object descriptions, in combination, define the boundary of an object. Block 520 may be followed by block 530.

At block 530, respective values of a loss function may be calculated. A loss function is a metric of a difference between a prediction provided by the model and a groundtruth value for the prediction. For example, the loss function may be a maximum likelihood loss function as described below. However, other loss functions could include mean squared error (MSE), mean average error (MAE), cross-entropy, and/or focal loss. A loss function may be chosen to provide a representation of area and perimeter differences, a measure of contour similarity. A loss function could penalize contour complexity or unrealistic outline shapes that would be unrealistic in groundtruth examples. Block 530 may be followed by block 540.

At block 540, parameters of a machine learning model are updated, which may be based on values of the loss function. For example, if the machine learning model is a neural network, the updating may include modifying connections and/or weights for nodes in the neural network. One approach often used to perform such updating is backpropagation and gradient descent. However, other machine learning models are possible in other implementations, and they may also be updated appropriately to perform supervised learning tasks. Block 540 may be followed by block 550.

At block 550, it is determined if the machine learning model is completely trained. If so, block 550 is followed by block 560. In this case, no further training is appropriate at the present time. If not, block 550 is followed by block 520. In this case, further training may be appropriate. Such additional training may train the machine learning model further on an existing training dataset, such as by performing more training epochs or by performing training based on additional training datasets. Even if a machine learning model is deemed completely trained at one point in time, it may be trained additionally later, such as if additional training data becomes available.

At block 560, the trained machine learning model is provided for object detection. The trained machine learning model has parameters that associate input overhead imagery with sequences of user input actions that indicate boundaries of objects in the overhead imagery with improved accuracy. Additional details about the architecture and training of the machine learning model are discussed with respect to FIG. 5B. Aspects of using the trained machine learning model are discussed with respect to FIG. 6.

Figure 5B:
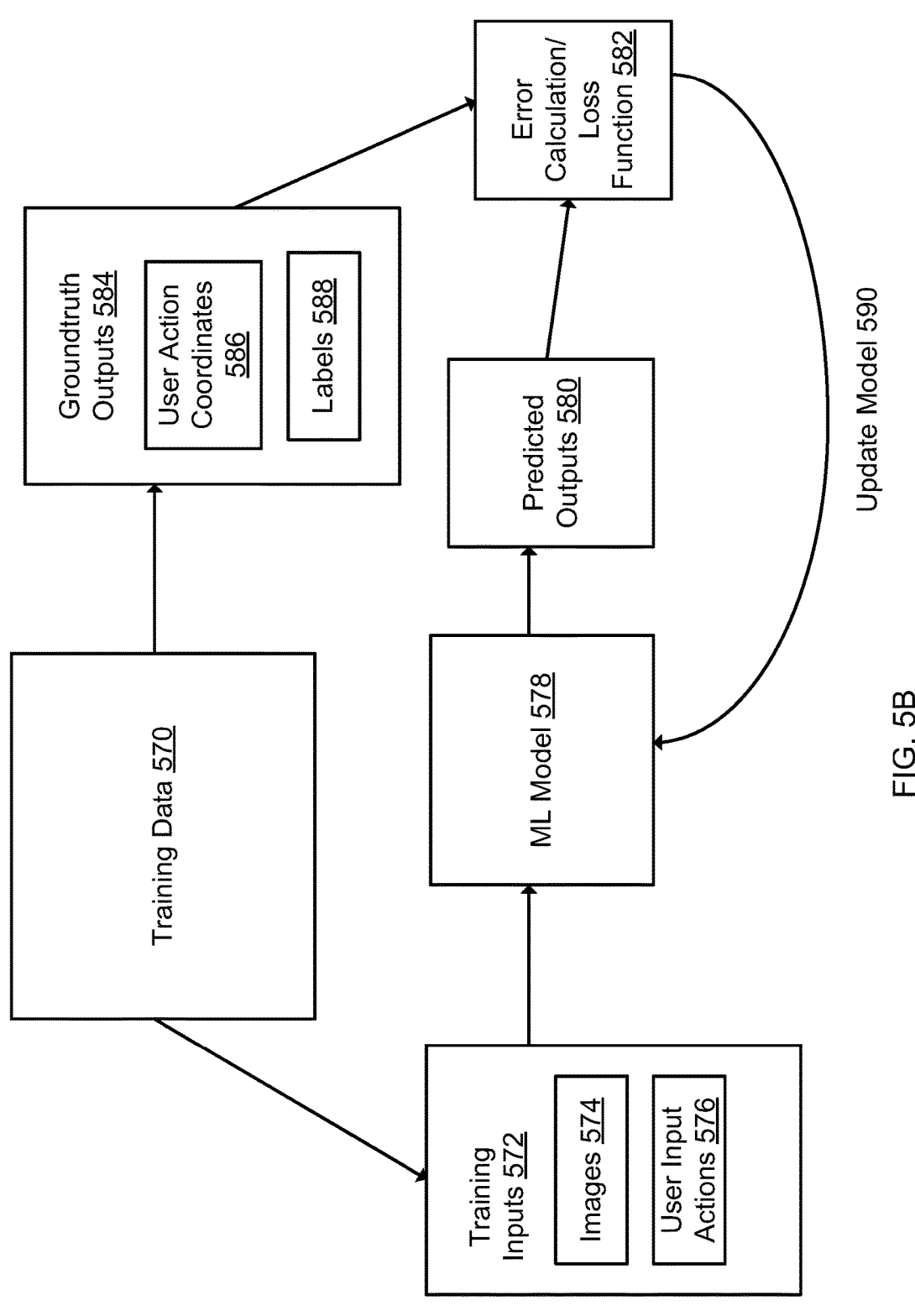
FIG. 5B is a block diagram of an example method to train a machine learning model, in accordance with some implementations.

FIG. 5B—Training Machine Learning Model

FIG. 5B is a block diagram of a method 500*b* to train a machine learning model, in accordance with some implementations. In FIG. 5B, there is a set of training data 570. The set of training data 570 may include information about images (e.g., overhead imagery of an area) and corresponding user input actions, such as sequences of clicks defining boundaries of objects in the images (as inputs) and groundtruth outputs, including endpoints of segments defining the boundaries and labels. The endpoints may be processed as a sequence of endpoints defining a given object or as a series of pairs of coordinates defining each edge of a given boundary of a given object. The labels may provide information about which object the boundary points pertain to, as well as any relevant ordering information and whether a boundary includes a curve (instead of being a straight line segment).

For example, training data 570 provides training inputs 572, which include images 574 and associated user input actions 576. In some implementations, the images 574 may include various types of overhead imagery, such as satellite imagery or photographs taken by an aerial vehicle such as a drone, balloon, airplane, helicopter, as non-limiting examples. The overhead imagery may include a variety of scenes or may include tiles comprising an overall scene. The user input actions 576 may include various inputs provided by manual annotation that specify object boundaries. For example, the user input actions 576 may include clicks that define the object boundaries.

The training inputs 572 are provided as inputs to machine learning model 578. For example, the machine learning model 578 may be a neural network. An example of neural network that may be used may be a picture to sequence model. Such a picture to sequence model is a specialized form of a deep learning model that involves taking a picture (provided as a bitmap of pixels, which may be associated with colors, grayscale, or monochrome information) and associating the picture with sequences of information, which may be provided as tokens that describe aspects of the picture, thereby performing a machine vision task.

In some implementations, the machine learning model 578 begins as a general-purpose machine vision machine learning model, pre-trained for a variety of machine vision tasks. However, it may be helpful to fine-tune the machine learning model 578 so that the machine learning model 578 provides good results for the particular use case of taking overhead images as input and identifying user input actions that accurately identify boundaries of objects in the overhead images. For example, the fine-tuning may include a moderately large training set (such as 200,000 or so annotated overhead images) and use the training set for the training presented in FIG. 5B.

The machine learning model 578 processes the training inputs 572 accordingly, providing predicted outputs 580. Here, the predicted outputs 580 may include a plurality of sequences of user actions (such as an ordered sequence of clicks in the image) defining predicted object boundaries in the image.

A picture to sequence model may cast object detection as a language modeling task, conditioned on pixel inputs. The picture to sequence model may consist of four main components: image augmentation, sequence construction and augmentation, architecture, and an objective/loss function. With respect to image augmentation, as is common in training computer vision models, some implementations may use image augmentation to enrich a fixed set of training examples (e.g. with random scaling and cropping). With respect to sequence construction and augmentation, object annotations are usually represented as a set of bounding boxes and class labels, which is converted into a sequence of discrete tokens.

However, given the specific nature of the object boundary recognition task, the two coordinates which otherwise define bounding boxes may be adapted for use as endpoints for segments that define an object boundary. With respect to architecture, the picture to sequence model may use an encoder-decoder model, where the encoder receives and processes pixel inputs, and the decoder generates the target sequence (one token at a time). With respect to objective/ loss function, the model is trained to maximize the log likelihood of tokens conditioned on the image and the preceding tokens (with a softmax cross-entropy loss).

The picture to sequence model may use an architecture and objective functions that have been effective in language modeling. As noted, the picture to sequence model may be pre-trained using a general machine vision model, trained to identify objects in an image. The picture to sequence model may then be fine-tuned to take input pictures and identify boundary segments for objects in the pictures as well as provide labels with sufficient information to manage the boundary segments.

For example, the picture to sequence model may use an encoder-decoder architecture. The encoder can be a general image encoder that perceives pixels and encodes them into hidden representations, such as a convolutional neural network (ConvNet), a Transformer, or their combination. For generation, the model may use a Transformer decoder, widely used in modern language modeling. The model may generate one token at a time, conditioned on the preceding tokens and the encoded image representation. This removes the complexity and customization in architecture of modern object detectors, e.g., coordinate proposal and regression, since tokens are generated from a single vocabulary with a softmax. Such tokens correspond to the user actions in the user action information that define the object boundaries and their attributes.

Similar to language modeling the machine learning model is trained to predict tokens, given an image and preceding tokens, with a maximum likelihood loss, i.e., maximize $$\sum_{j=1}^{L} w_j \log P(\tilde{y}_j \mid x, y_{1:j-1})$$

where x is a given image, y and $\tilde{y}$ are input and target sequences associated with x, and L is the target sequence length. y and $\tilde{y}$ are identical in the standard language modeling setup, but they can also be different (as in an alternative augmented sequence construction. Also, $w_j$ is a pre-assigned weight for a j-th token in the sequence. $w_j$ is set as $w_j=1 \forall j$, however it is be possible to weight tokens by their types (e.g., coordinate vs. class tokens), or by the size of the corresponding object. Some implementations may also use reinforcement learning to optimize for arbitrary reward functions (even if they are non-differentiable as typically required for loss functions). Such an approach may help maximize recall.

At inference time, the model may sample tokens based on model likelihood, i.e., $P(\tilde{y}_j|x, y_{1:j-1})$. This can be done by either taking the token with the largest likelihood (argmax sampling) or using other stochastic sampling techniques. In some implementations, using nucleus sampling may lead to higher recall than argmax sampling. The sequence may end with an end-of-sequence (EOS) token. Once the token sequence is generated, it is straightforward to extract and dequantize the object descriptions (i.e., obtaining the predicted coordinates for boundaries and class labels).

The predicted outputs 580 are provided for error calculation at loss function 582. Loss function 582 compares the predicted outputs 580 to groundtruth outputs 584. The groundtruth outputs 584 are compiled using manual annotation. For example, the groundtruth outputs 584 may include user action coordinates 586 and labels 588. For a given object in the training data 570, the groundtruth outputs 584 may include an ordered series of user action coordinates 586 and labels 588.

For example, the user action coordinates 586 may include an ordered series of x and y coordinates for every boundary point for a given object that is to be recognized by the ML model. The labels may indicate which object given boundary points are a part of, an ordering of the boundary points, and other information about a boundary (such as a curvature).

Loss function 582 measures a difference between predicted outputs 580 and groundtruth outputs 584, in order to make the loss function 582 as small as possible. By minimizing the loss function 582, ML model 578 is trained so that when the ML model 578 encounters new images, ML model 578 is able to generate predicted outputs 580 (including user action coordinates and appropriate labels) as accurately as possible. For example, the ML model may be a neural network and updating the one or more parameters of the ML model based on the values of the loss function comprises one or more of automatically adjusting a weight of one or more nodes of the neural network or automatically adjusting connectivity between one or more pairs of nodes of the neural network.

Thus, based on the loss function 582, there is performed an update to the model 590. Such an update to the model 590 may occur if the ML model 578 is a neural network by updating weights and connections in the neural network. One technique for such updating may include backpropagation, such as by using a gradient descent approach. In general, the training causes the ML model 578 to perform better and better at the task of taking overhead images of an area and identifying sequences of user actions that identify how to find boundaries of objects present in the images.

Figure 6:
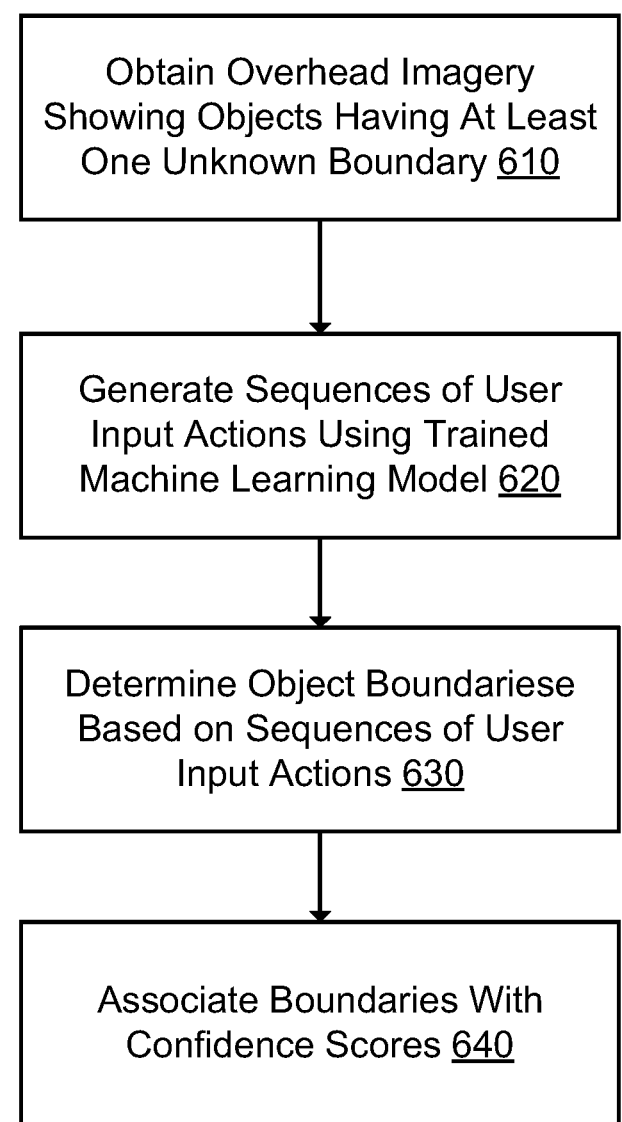
FIG. 6 is a flowchart of an example method to identify object boundaries using a trained machine learning model, in accordance with some implementations.

FIG. 6—Using Machine Learning Model to
Identify Object Boundaries

FIG. 6 is a flowchart of a method 600 to use a machine learning model to identify object boundaries, in accordance with some implementations. FIG. 6 shows how to take overhead imagery and find boundaries of corresponding objects within the overhead images. Method 600 may begin at block 610.

At block 610, overhead imagery showing objects having at least one unknown boundary is obtained. In some implementations, the overhead imagery may be an overhead image illustrating an entire scene to be considered. In some implementations, the overhead imagery may include a plurality of tiles that, when stitched together during postprocessing, provide an entire scene. The overhead imagery may also include multiple images of the same scene or portions of the same scene.

The use of multiple images may aid in the production of predictions that balance accuracy against freshness. Here, accuracy refers to providing boundaries for objects in the overhead imagery that are close approximations of the actual boundaries of the objects in the real world. Freshness refers to providing boundaries for objects in the overhead imagery that are up-to-date and correspond to the most recent state of the real world.

Freshness may come at the expense of accuracy because freshness is potentially obtained by using a lower-resolution but more frequently acquired signal. Some implementations may consider a single or a set of freshness images to decide whether an object still exists in the real world or has been moved or demolished as well as choosing a best possible outline from the available images. Such a best possible outline may be obtained using heuristic criteria that improve confidence about object area and/or optimize aesthetic criteria for a shape.

It may also be helpful to include multiple images of the same scene or portions of the same scene because portions of imagery may be obscured. For example, if there is cloud cover or smoke cover obscuring all or part of an image, it may be necessary to interpret all or part of the image as being obscured and use other images or parts of other images to infer how to accurately model the image.

For a boundary to be unknown may refer to several conditions. First, there may simply be no information about object boundaries. In this case, the only information available is the overhead imagery itself and there is no pre-existing information about where objects are or where any boundaries of any objects are.

Second, there may be information about object boundaries that is known to be approximate. In this case, the overhead imagery is associated with polygons that are known to be somewhat related to the actual outlines of buildings but are known to be inexact. In such a case, the approximations may help infer where the actual boundaries are, but the actual boundaries still are to be determined.

Third, there may be information about object boundaries that is associated with previously determined confidence metrics. In this case, some of the confidence metrics may be equal to or greater than a threshold confidence value, and some of the confidence metrics may be less than the threshold confidence value. Because some of the boundaries are known with sufficient confidence, only the boundaries whose confidence are less than the threshold value may be found. Block 610 may be followed by block 620.

At block 620, predicted sequences of user input actions are generated using a trained machine learning model. Examples of training such a trained machine learning model are discussed in FIGS. 5A-5B. The generation begins by providing the overhead imagery received at block 610 as input to the trained machine learning model. The trained machine learning model, which may be a picture to sequence model, takes the input imagery and associates the imagery with sequences of user input actions.

For example, in a given image, the sequences of user input actions may correspond to sets of clicks (or other user input actions) that identify coordinates of points that, when connected, form accurate boundaries for the objects to be modeled. The user input actions may also include labels that serve as supplemental information to successfully connect the points. Such supplemental information may designate which objects correspond to which points, the order in which points are to be connected, and other properties of the connections (straight vs. curved, etc.) The training data is provided such that object boundaries are defined one object at a time, in order, so the model generates its resulting points to define edges in a comparable manner. Block 620 may be followed by block 630.

At block 630, object boundaries are determined based on the predicted sequences of user input actions. For example, in a given image, there may be one or more objects associated with sequences of user actions. It is possible that an image may not include any objects, especially if an image is a tile that is a part of a larger set of images, but the method 600 assumes that a given image includes at least one object (or a portion of an object) given that the method is useful in situations in which at least one object (or a portion of an object) is identifiable.

The object boundaries may be determined by connecting points corresponding to the sequences of user actions. These points may be connected in an order provided by the associated labels. Additionally, it may be possible that an object boundary does not include an entire object. For example, if an overhead image illustrates an entire scene, there may be some objects located at the edges of the scene where only a portion of a given object is included in the scene. Alternatively, if the overhead images include tiles of an overall image, individual images may only include portions of an object that is included in the entire scene. In such a case, post-processing including stitching uses techniques to determine where portions of the same object are located Block 630 may be followed by block 640.

At block 640, object boundaries may be associated with confidence scores. For example, the picture to sequence model may be trained to output, in addition to the boundary coordinates and the labels that lend the coordinates context, a metric of a confidence associated with each coordinate and/or each boundary. In some implementations, each coordinate is associated with a confidence while in other implementations, information about each coordinate or information about a boundary of an object as a whole. Confidence scores may be obtained in various ways. In some implementations, confidence scores may be obtained using heuristics to combine the token logits, where the logit function is mathematically defined as the logarithm of the odds of the probability p of a certain event occurring. For example, implementations may take confidence scoring from the logit value (or softmax on the logits) of a class token, or by averaging all of the logits scores of all coordinate tokens, or may take the minimum logit score for all tokens associated with the object. Alternately, some implementations may have the model predict a confidence using reinforcement learning.

The confidence scores may be used to help some implementations in various ways. For example, the confidence scores may help implementations filter out low quality detections prior to editing the map, identify tiles that are to be reviewed by a human before editing the map, inform which detections are to be preferred by the stitching algorithm, inform downstream users if the detection is high enough quality for the applications used by the users. In terms of stitching/heuristics, each final contour may also optionally be associated with an estimated measure of completeness, either evaluated by the heuristic itself or potentially by a secondary model that takes larger tiles as inputs and thus has more context to decide on the contour completeness post-stitching.

Block 640 may be followed by providing the determined object boundaries for applications such as for navigation, two-and-a-half dimensional (2.5D)/three-dimensional (3D) viewing, urban planning applications, etc.

Figure 7A:
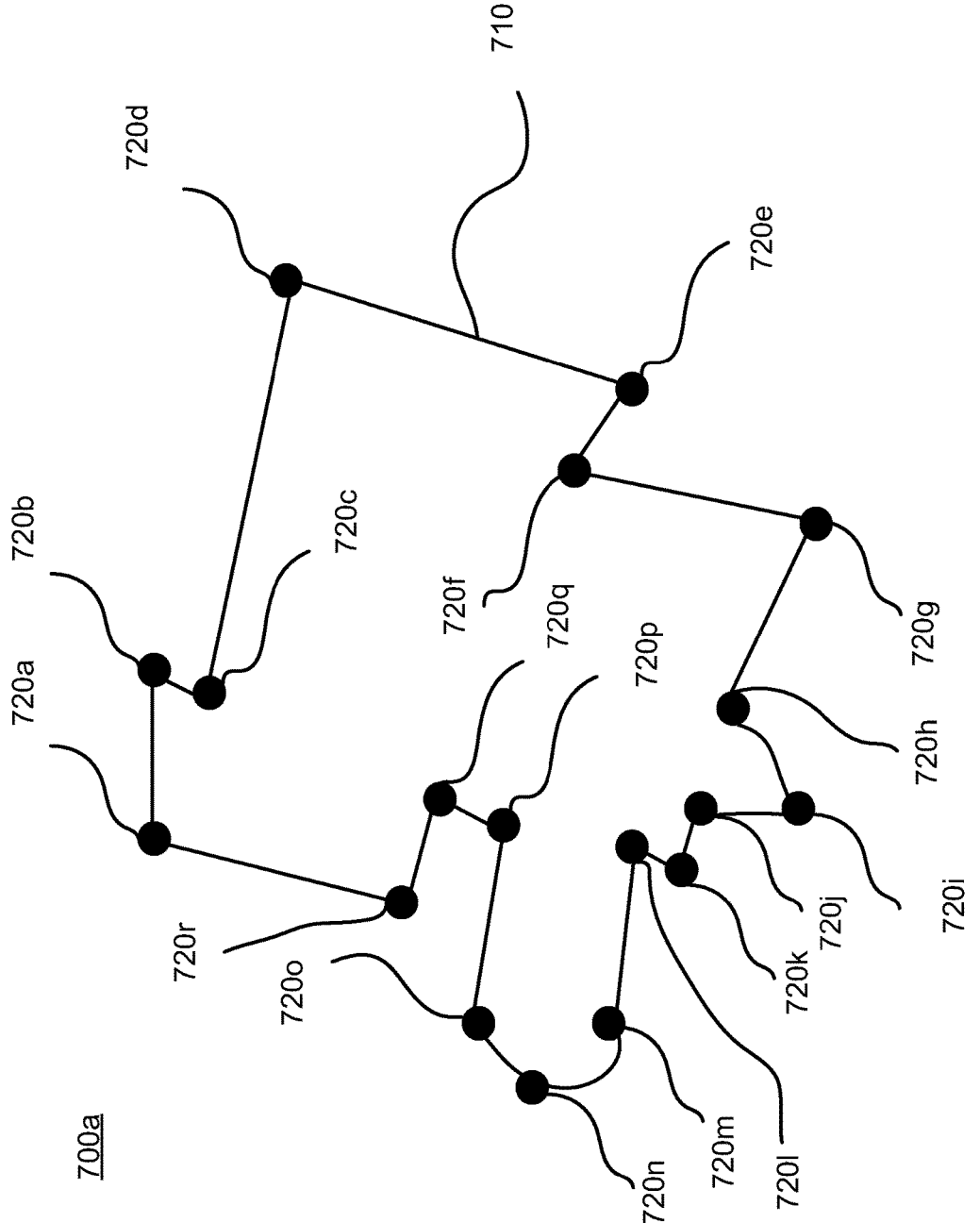
FIG. 7A is a block diagram illustrating an object boundary defined by a series of user actions including clicks at points in a region, in accordance with some implementations.

FIG. 7A—Object Boundary Defined by User Input Actions

FIG. 7A is a block diagram 700*a* illustrating an object boundary defined by a series of user actions including clicks at points in a region, in accordance with some implementations. FIG. 7A illustrates an object boundary 710. The object boundary 710 is an example of the output provided by using a trained machine learning model, as trained in FIGS. 5A-5B and as applied in FIG. 6. The object boundary 710 is defined by a series of clicks 720*a*, 720*b*, 720*c*, 720*d*, 720*e*, 720*f*, 720*g*, 720*h*, 720*i*, 720*j*, 720*k*, 720*l*, 720*m*, 720*n*, 720*o*, 720*p*, 720*a*, and 720*r*.

Each click is associated with coordinates in the plane defined by the overhead imagery. As discussed, the object boundary 710 could be defined by the series of clicks 720*a*, 720*b*, 720*c*, 720*d*, 720*e*, 720*f*, 720*g*, 720*h*, 720*i*, 720*j*, 720*k*, 720*l*, 720*m*, 720*n*, 720*o*, 720*p*, 720*a*, and 720*r*, defined in keeping with the output of the trained machine learning model. Alternatively, such points could be obtained using other types of user input actions mapped to the picture to define a boundary. For example, the trained machine model defines, for each object, an ordered series of boundary points or boundary segments. The trained machine model may also indicate if two or more boundary points define a curved portion of the boundary (the curve may pass through the points or the points may define a curve by acting as control points for a curve).

Figure 8A:
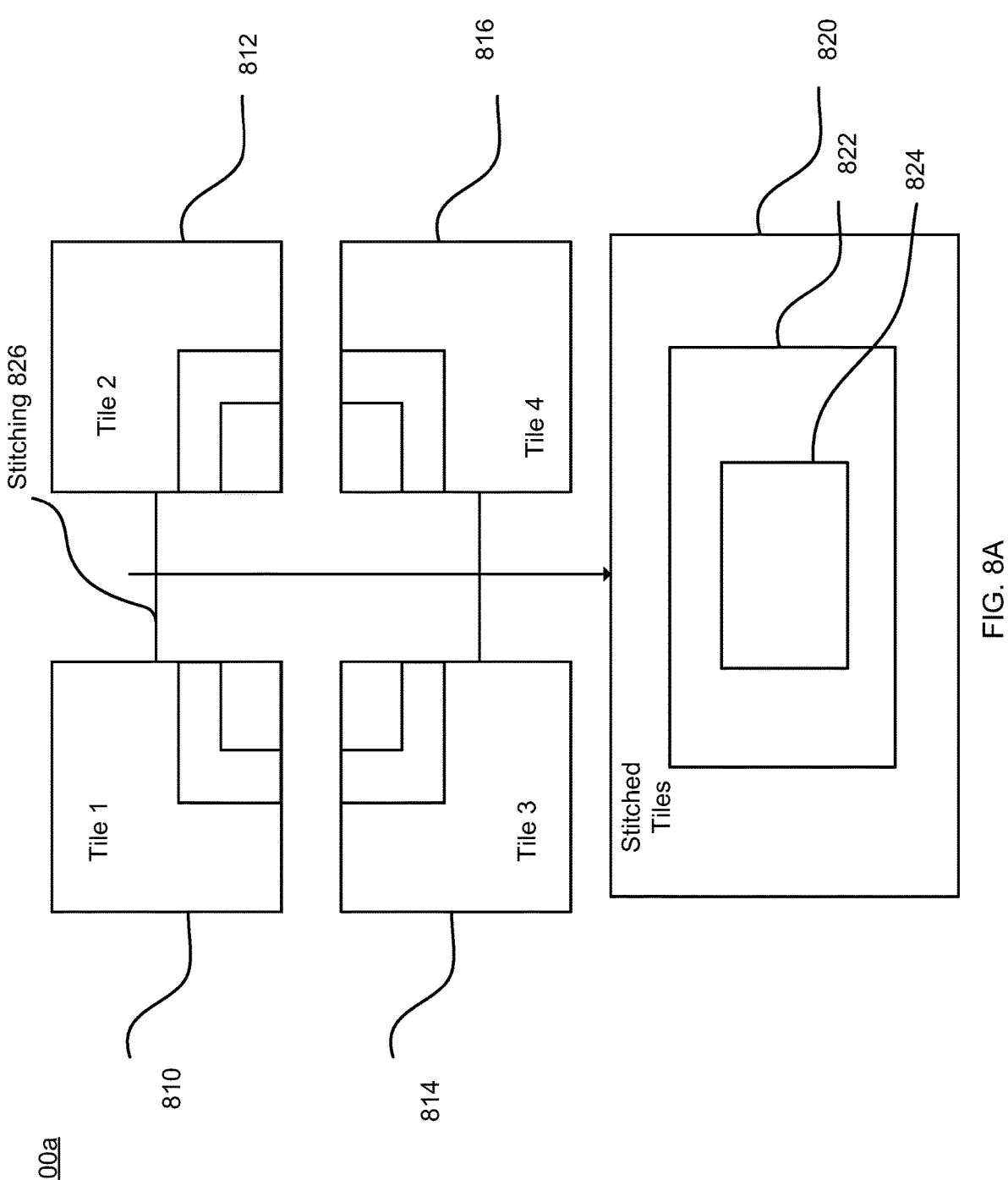
FIG. 8A is a block diagram illustrating an example of stitching tiles together to define an object that spans multiple tiles, in accordance with some implementations.

Additionally, as illustrated further in the example of FIG. 8A, the boundary portions may define multiple portions of the same object, such that a complete object is identified by identifying an object that extends onto multiple tiles that can be assembled by stitching during post-processing. While FIG. 7A illustrates an object boundary 710 for a complete object, it is also possible that only a portion of an object is included in a given scene and a boundary of an object is taken to be a boundary of the image, given that the entire object is not illustrated in a single image.

To identify the object boundary 710, in one implementation, each of the series of clicks 720 is connected, in sequence. For example, the clicks may be connected by line segments. In general, the clicks 720 are connected by straight line segments. However, in other implementations, the example clicks may include curved connections. For click 720*h*, click 720*i*, and click 720*j* define a curved portion of the object boundary 710. Additionally, click 720*m*, click 720*n*, and click 720*o* define another curved portion of the object boundary 710. The labels of the clicks (or other user input actions) may also provide for how the clicks in the series of clicks 720 are to be combined to yield the object boundary 710.

In some implementations, the curved nature of this portion of object boundary 710 may be captured in the labels associated with click 720*m*, click 720*n*, and click 720*o*. Alternatively, there may be a separate data structure associated with the user input actions that provides additional information about how the edges are formed. For example, the entire boundary, instead of being defined by line segments, could use the points to define a curve such as a bézier curve, with the points being designated as control points for the curve. However, curves may also be represented by connecting a large number of small straight segments.

Figure 7B:
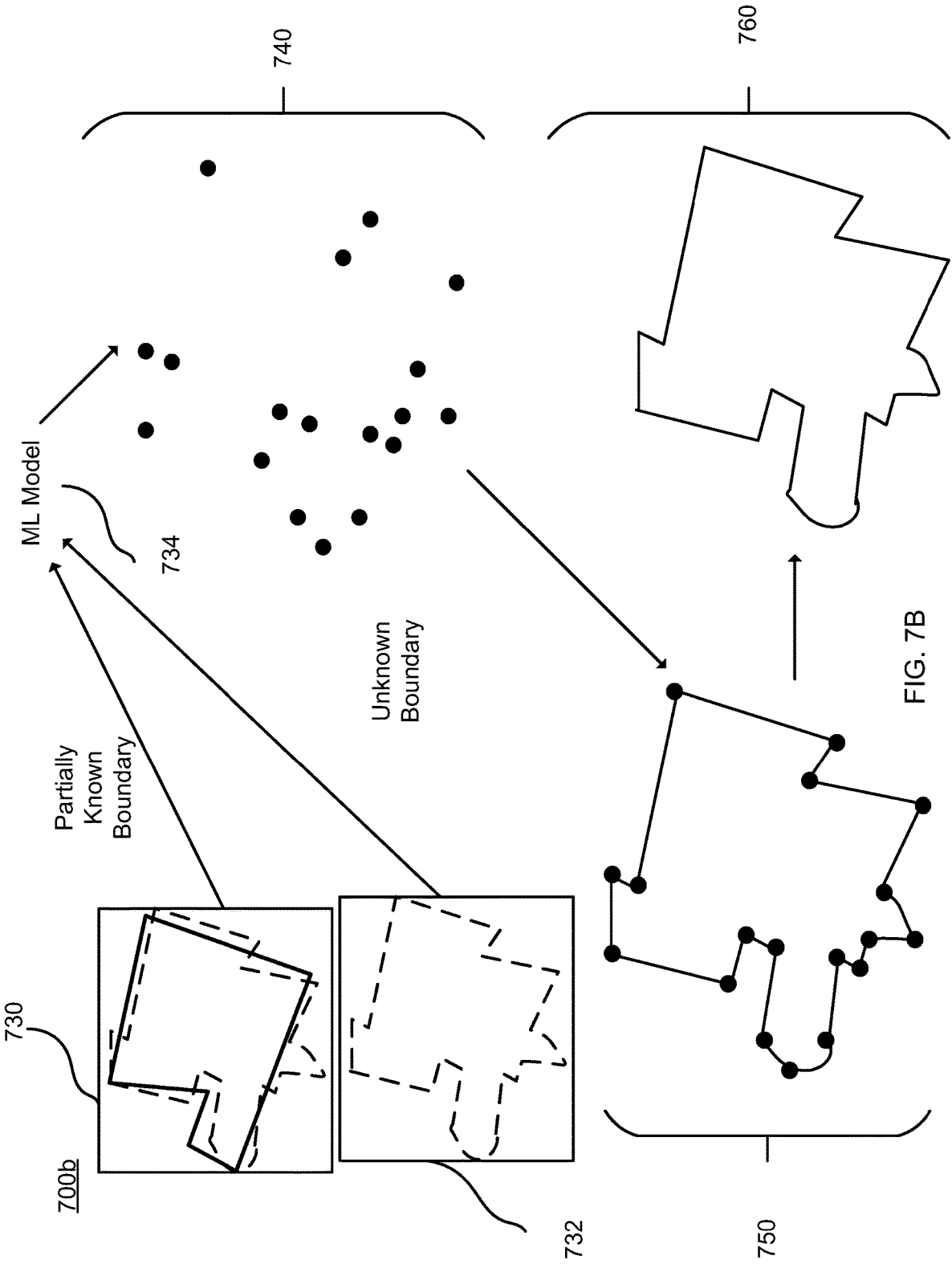
FIG. 7B is a block diagram illustrating how map information is used to generate boundary points and a building outline, in accordance with some implementations.

FIG. 7B—Generating Boundary Points and Object Outline

FIG. 7B is a block diagram 700*b* illustrating how map information is used to generate boundary points and a building outline, in accordance with some implementations. FIG. 7B illustrates a piece of overhead imagery 730 including a partially known boundary. That is, the overhead imagery 730 illustrates an image of a building (whose actual boundary is illustrated in dashed lines), but the process has no access to information about the building beforehand.

Overhead imagery 732 illustrates a similar dashed line as that illustrated in overhead imagery 730, corresponding to an actual boundary of a building. However, overhead imagery 732 includes an outline (in a solid line) that is a rough approximation of the actual boundaries of the underlying building. Hence, overhead imagery 732 is referred to as having a partially known boundary. While this example is shown with respect to a building outline, the principles pertain to outlines of other objects.

The overhead imagery 730 and the overhead imagery 732 may be provided as input to machine learning (ML) model 734. Based on analyzing the imagery as per its training (and possibly based on the approximated boundary in overhead imagery 732), the ML model 734 may generate a cluster of points 740 in the image. The cluster of points 740 may correspond to a sequence of user actions, such as clicks, that are otherwise manually generated to define a boundary of an object. The cluster of points 740 are associated with an ordering that they occur along the boundary of the object.

For example, the points may be connected using straight line segments. However, it may also be possible to connect points using curved line segments. The model can also output as many straight line segments as needed to approximate and/or represent a curve. For example, when the points are generated, they may be associated with coordinates in the image plane. The label for a given point may disclose where in the sequence of points the given point is, as well as information about how the point is to be connected to other points.

An example result of connecting points is outline 750. Outline 750 includes the defined click points, generated by ML model 734. The model may generate one of two types of results. In one type, the model may generate a sequence of points. The sequence of points is an ordered sequence defining boundaries of a given object. Each object has its own set of boundary points.

However, the model may also be adapted to generate two points at a time, including a start and an end of a line segment. The line segment may be associated with a label that provides information about how the line segment relates to other portions of the outline and the shape of the outline. By default, the outline is a straight segment, but in some implementations, the points may define a curve by being connected by curves or acting as control points for a curve.

Outline 760 illustrates a simplified version of the outline 750, with the click points removed. Outline 760 is more representative than what is illustrated in overhead imagery 730 as an approximation. For example, outline 760 is able to illustrate protrusions and deviations from the original simple shapes. Outline 760 also illustrates that there are regions where the edge of outline 760 are curved rather than straight, accordingly being a better representation of the actual boundary of the object.

FIG. 8A—Stitching Tiles to Define Object Spanning Multiple Tiles

FIG. 8A is a block diagram 800*a* illustrating an example of stitching tiles together to define an object that spans multiple tiles, in accordance with some implementations. For example, an overhead map of an area may include four tiles, tile 1 810, tile 2 812, tiles 3 814, and tile 4 816. For example, tile 1 810 includes a portion of a building in the lower-right corner, with its center in its lower-right. Tile 2 812 includes a portion of a building in the lower-left corner, with its center in its lower-left. Tile 3 814 includes a portion of a building in the upper-right corner, with its center in its upper-right. Tile 4 816 includes a portion of a building in the upper-left corner, with its center in its upper-left. When each tile is interpreted by the ML model, the model is able to identify that there is an object outline (a building boundary) in the appropriate corner, having a central hole further into the corner region.

In some implementations, individual images in the overhead imagery may correspond to tiles for a map, each tile with associated coordinates, and at least two of the tiles may be stitched together to form a portion of the map.

Tile 1 810, tile 2 812, tiles 3 814, and tile 4 816 are collectively subjected to stitching 826. The result of the stitching 826 is a unified building 822 that combines the portions of buildings illustrated in tile 1 810, tile 2 812, tiles 3 814, and tile 4 816. The stitching 826 also establishes that there is a central hole 824 in the center of the unified building 822. Tile 1 810, tile 2 812, tiles 3 814, and tile 4 816 are illustrated as fitting together with one another exactly or almost exactly (i.e., the edges of the tiles match exactly or almost exactly).

However, in some implementations, the tiles may overlap or include gaps, and it may be helpful to use techniques that cause the stitching to correct for the overlaps and/or the gaps. For example, the stitching may identify overlaps and avoid duplication, or may extrapolate an appropriate way to fill in for gaps. As an example, if there is a gap between two tiles, it may be possible to infer that two corresponding segments of a boundary are to be joined by extending a straight line to bridge the missing part of the boundary. For example, the stitching may use other heuristics that help determine object boundaries for each tile of the tiles, establish how object boundaries match one another, and include how the holes in the centers of the objects match one another.

Implementations identify boundaries corresponding to multiple portions of a given overall object in various ways. Some implementations may match boundaries purely based on an amount of total overlap between two objects, such as an object A in tile X1 and an object B in tile X2. Other implementations may consider, for an object A in tile X1 and an object B in tile X2, what the shared area of the objects is in margins of the tiles (common to tiles X1 and X2) and compare the shared area to the total areas (union) of object A and object B in the margins. If the shared area is greater than or equal to some percentage of a total area in the margins, this approach decides that a match exists. Otherwise, this approach decides that no match exists. Still other implementations require that object A and object B share the identity of the tile edge that these objects are flush against, and compare such edges to one another to indicate whether an amount of overlap is sufficiently significant that the objects match one another.

Figure 8B:
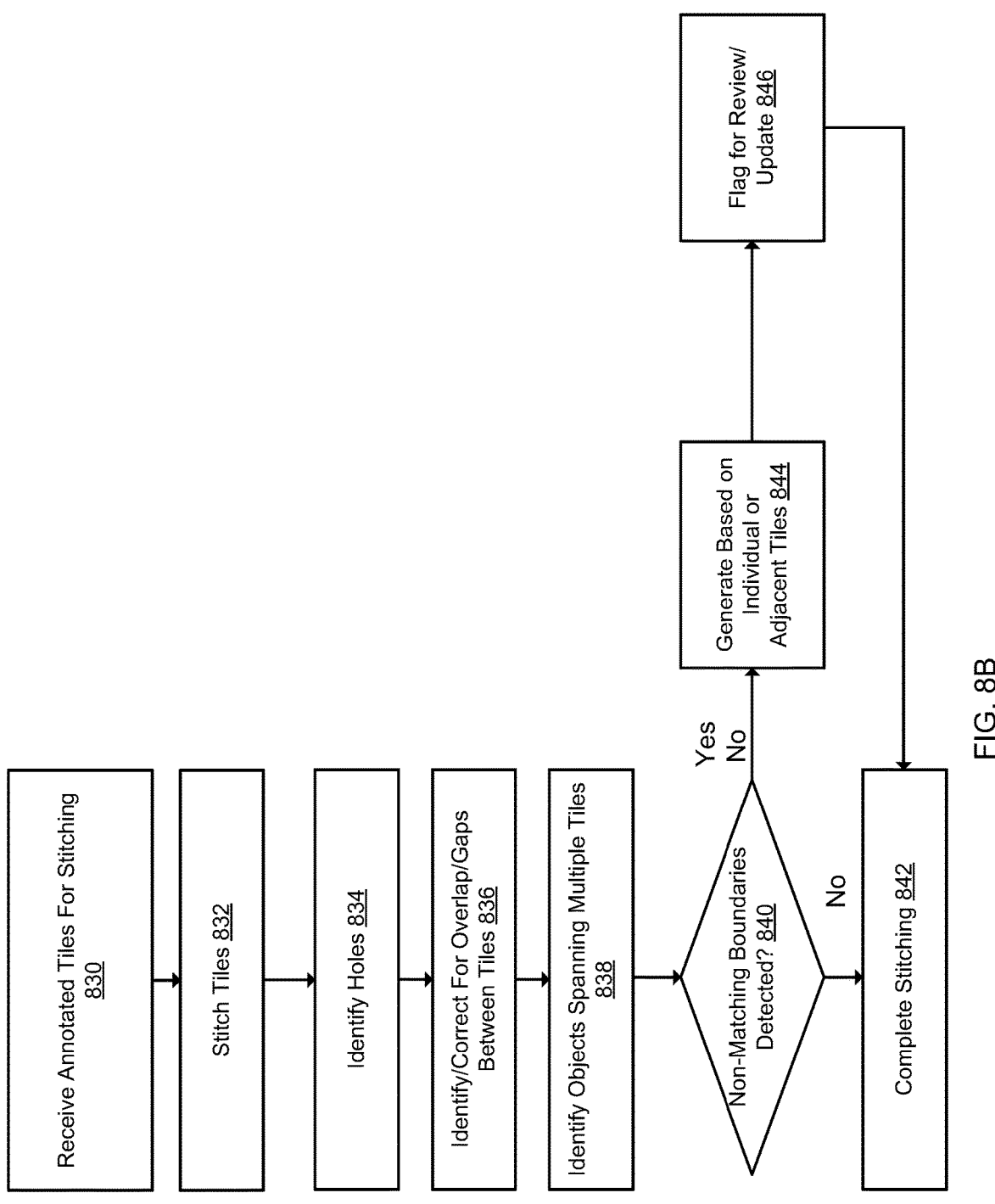
FIG. 8B is a flowchart of a method to perform stitching of tiles, in accordance with some implementations.

FIG. 8B—Performing Stitching

FIG. 8B is a flowchart of a method 800b to perform stitching, in accordance with some implementations. The method 800b may start at block 830.

At block 830, annotated tiles for stitching are received. Examples of such tiles are tile 1 810, tile 2 812, tile 3 814, and tile 4 816. The tile boundaries may align exactly with one another. Alternatively, the tile boundaries may include overlaps or gaps, which are managed at block 840. Block 830 may be followed by block 832.

At block 832, the tiles are stitched. For example, stitching involves heuristics and other techniques that establish which boundary information identified for each tile corresponds to that in other tiles, and the tiles are unified into an overall picture. As an initial stitching step in block 832, it may be possible to determine where in the overall scene various tiles are to go. For example, one tile could be associated with an upper-right corner of the scene, while another tile is associated with a central portion of the scene. Block 832 may be followed by block 834.

At block 834, any holes in the objects are identified. For example, if a boundary of an object surrounds an inner region in a single tile, such that an object has an outer region and an inner region, that inner region may be considered to be a hole. Alternatively, if objects are present at edges of multiple tiles and corresponding portions of objects in multiple tiles surround a central region, such a region may be considered a hole region. Block 834 may be followed by block 836.

At block 836, overlap/gaps between tiles are identified and corrected for. For example, portions of tiles may be matched, and if the portions match one another, these portions may be considered to be overlapping and may be removed and/or combined accordingly. Alternatively, if portions of tiles almost match, other than a region that is undefined in each tile, which may be a gap, and extrapolation techniques may permit the stitching to fill in the gaps. Block 836 may be followed by block 838.

At block 838, objects spanning multiple tiles are identified. Part of identifying such objects includes identifying parts of the multi-tile objects in separate tiles and unifying them into an outline for a complete building. An example of an object spanning multiple tiles and a corresponding stitching process is illustrated by way of example in FIG. 8A. One way to identify objects spanning multiple tiles is to look at object boundaries located at the edges of tiles and see if the boundaries match or can be made to match by correcting for overlap/gaps. Block 838 may be followed by block 840.

At block 840, it is detected if the tiles have non-matching boundaries. Such non-matching boundaries may occur if the tiles are misaligned or otherwise overlap or have gaps that involve resolution. If non-matching boundaries are not detected, block 840 is followed by block 842. If non-matching boundaries are detected, block 840 is followed by block 844.

At block 842, the stitching is completed. When the stitching is complete, the stitched picture may be provided for applications such as navigation, 2.5D/3D views, urban planning applications, etc. The stitched picture may include a picture of an entire region constructed by using available information from the stitched tiles. As discussed, the stitching may include managing various issues such as holes, overlap/gaps, multi-tile objects, and non-matching boundaries.

At block 844, the predicted sequences may be generated based on individual tiles or based on adjacent tiles. By proceeding in this manner, it may be possible to use information for individual tiles or it may be possible to combine information associated with adjacent tiles. Block 844 may be followed by block 846.

At block 846, it is determined whether to react to the non-matching boundaries by flagging an issue for review or update. Such flagging may improve performance but may involve human review or intervention. Block 846 may followed by block 842. The tiles in question may be flagged for manual review, automatic review, or updating. By flagging tiles, it may permit correction of issues that cannot be resolved automatically or may ensure that automatic steps to correct issues are successful before assuming that the overall map and its object boundaries are ready and complete. For example, some aspects of stitching may be handled automatically using various criteria. However, there may be situations where stitching is indicated, but automatic stitching does not pass additional validation. In these situations, some factors indicates that further review is appropriate. There may a particularly tricky case or it may be necessary to train the model further and/or further adapt heuristics. Block 844 and block 846 may be optional and may be performed in either order to better manage situations in which non-matching boundaries are detected.

It may be noted that the operations performed in method 800b may be performed in a variety of orders. While the various operations that comprise the stitching in FIG. 8B are presented in a certain order, other orders are possible and the operations may be repeated until the results of the stitching are deemed to have successfully resolved enough of the issues involved in the stitching, including matching tile boundaries, holes, overlapping, gaps, multi-tile objects, and so on. Successful stitching may also involve repeating stitching or flagging problems.

Figure 9:
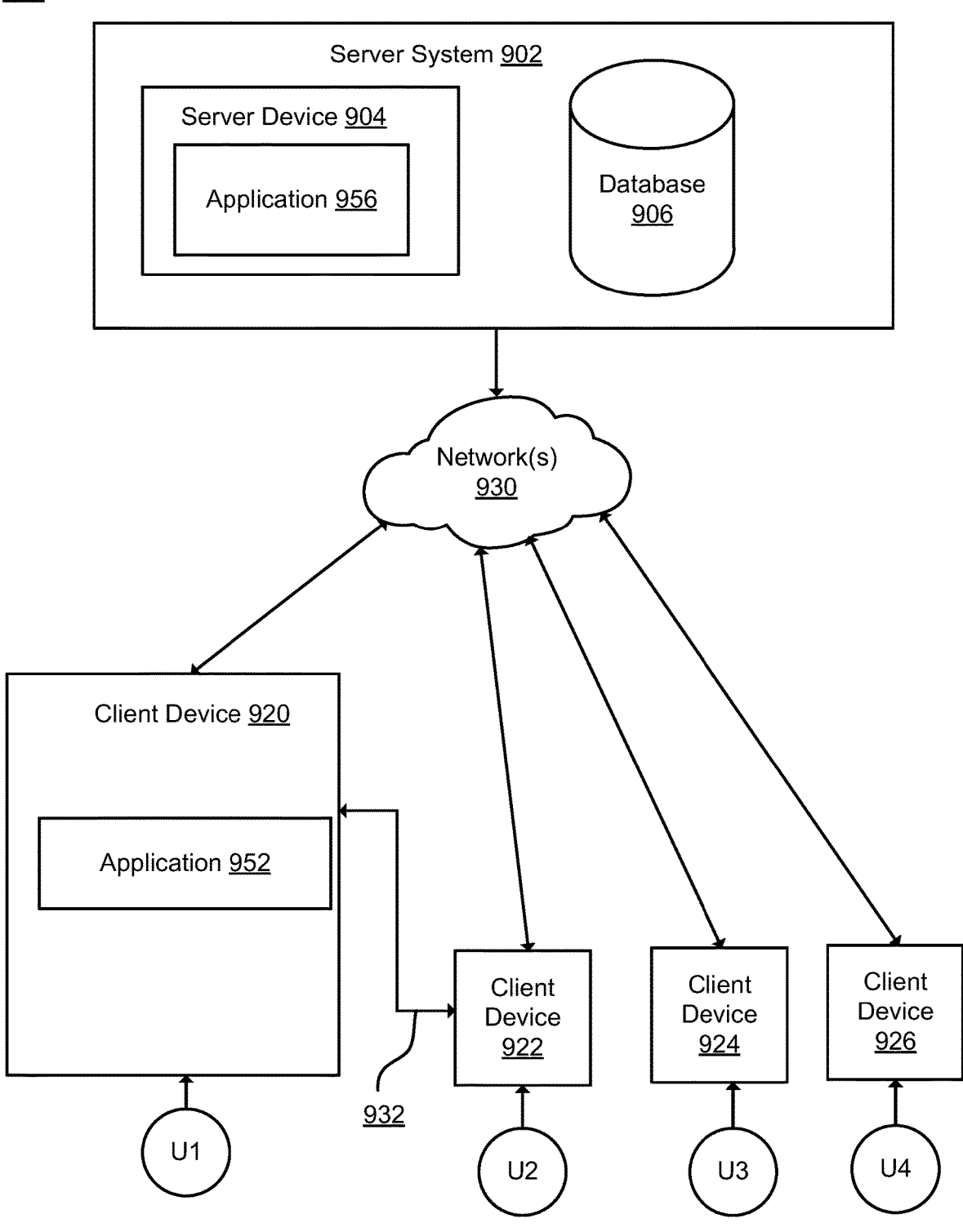
FIG. 9 illustrates a block diagram of an example network environment which may be used in some implementations described herein.

FIG. 9—Example Network Environment

FIG. 9 illustrates a block diagram of an example network environment 900 which may be used in some implementations described herein. FIG. 9 and the other figures use like reference numerals to identify like elements. A letter after a reference numeral, such as "956a," indicates that the text refers specifically to the element having that particular reference numeral. A reference numeral in the text without a following letter, such as "956," refers to any or all of the elements in the figures bearing that reference numeral (e.g. "956" in the text refers to reference numerals "956a" and/or "956b" in the figures).

In some implementations, network environment 900 includes one or more server systems, e.g., server system 902 in the example of FIG. 9. Server system 902 can communicate with a network 930, for example. Server system 902 can include a server device 904 and a database 906 or other storage device. Database 906 may store one or more images and/or videos and metadata associated with the one or more images and/or videos. In some implementations, server device 904 may provide an application 956. Application 956 may access the images stored in database 906.

Network environment 900 also can include one or more client devices, e.g., client devices 920, 922, 924, and 926, which may communicate with each other and/or with server system 902 via network 930. Network 930 can be any type of communication network, including one or more of the Internet, local area networks (LAN), wireless networks, switch or hub connections, etc. In some implementations, network 930 can include peer-to-peer communication between devices, e.g., using peer-to-peer wireless protocols (e.g., Bluetooth®, Wi-Fi Direct, etc.), etc. One example of peer-to-peer communications between two client devices 920 and 922 is shown by arrow 932.

For ease of illustration, FIG. 9 shows one block for server system 902, server device 904, and database 906, and shows four blocks for client devices 920, 922, 924, and 926. Server-related blocks 902, 904, and 906 may represent multiple systems, server devices, and network databases, and the blocks can be provided in different configurations than shown. For example, server system 902 can represent multiple server systems that can communicate with other server systems via the network 930. In some implementations, server system 902 can include cloud hosting servers, for example. In some examples, database 906 and/or other storage devices can be provided in server system block(s) that are separate from server device 904 and can communicate with server device 904 and other server systems via network 930.

There may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also include a local database similar to database 906 or other storage. In some implementations, network environment 900 may not have all of the components shown and/or may have other elements including other types of elements instead of, or in addition to, those described herein.

In various implementations, end-users U1, U2, U3, and U4 may communicate with server system 902 and/or each other using respective client devices 920, 922, 924, and 926. In some examples, users U1, U2, U3, and U4 may interact with each other via applications running on respective client devices and/or server system 902 via a network service, e.g., a social network service, an image hosting service, or other type of network service, implemented on server system 902. For example, respective client devices 920, 922, 924, and 926 may communicate data to and from one or more server systems, e.g., server system 902.

In some implementations, the server system 902 may provide appropriate data to the client devices such that each client device can receive communicated content or shared content uploaded to the server system 902 and/or network service. In some examples, users U1-U4 can interact via audio or video conferencing, audio, video, or text chat, or other communication modes or applications. A network service implemented by server system 902 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 920, 922, 924, and/or 926 can provide one or more applications, e.g., a digital map application, a map annotation application, a machine learning application, etc. Client devices 922-926 may also provide similar applications. For example, an application 952 (which may be digital map application 952) may provide a user of a respective client device (e.g., users U1-U4) with the ability to view a digital map, to pan/zoom across various areas of the digital map, to seek navigation guidance, to view objects on the digital map, to perform geographic searches, etc. For example, a map annotation application may enable a user to provide a sequence of clicks or other input to indicate object boundaries for objects in a digital map In some implementations, application 952 may implement (e.g., partially or wholly) the methods described herein with reference to FIGS. 5A-5B, 6, and 8B. In some implementations, application 956 may implement (e.g., partially or wholly) the methods described herein with reference to FIGS. 5A-5B, 6, and 8B.

Application 952 may be implemented using hardware and/or software of client device 920. In different implementations, application 952 may be a standalone application, e.g., executed on any of client devices 920-924, or may work in conjunction with application 956 provided on server system 902.

Database 906 may store coordinates and labels (e.g., coordinates of border points and/or endpoints and labels defining appropriate metadata) associated with one or more of the objects and the object boundaries. For example, a coordinate may specify an endpoint of a line segment included in an object boundary, specify a point included in an object boundary, etc. The label may include information about which object an associated coordinate corresponds to, ordering or sequence information for associated coordinates, and/or shape information about boundary segments (such as if segments are straight or curved).

A user interface on a client device 920, 922, 924, and/or 926 can enable display of user content and other content, including images, video, data, and other content as well as communications, privacy settings, notifications, and other data. Such a user interface can be displayed using software on the client device, software on the server device, and/or a combination of client software and server software executing on server device 904, e.g., application software or client software in communication with server system 902. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 902 and/or one or more client devices 920-926 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to send or broadcast a content post, e.g., to a broadcast area, and/or can output a notification indicating that a content post has been received by the device and, e.g., the device is in the defined broadcast area for the post. The communication program can display or otherwise output transmitted content posts and received content posts, e.g., in any of a variety of formats. Content posts can include, e.g., images, shared with other users.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display data (e.g., content) stored on storage devices local to the client device, e.g., received previously over communication networks.

Figure 10:
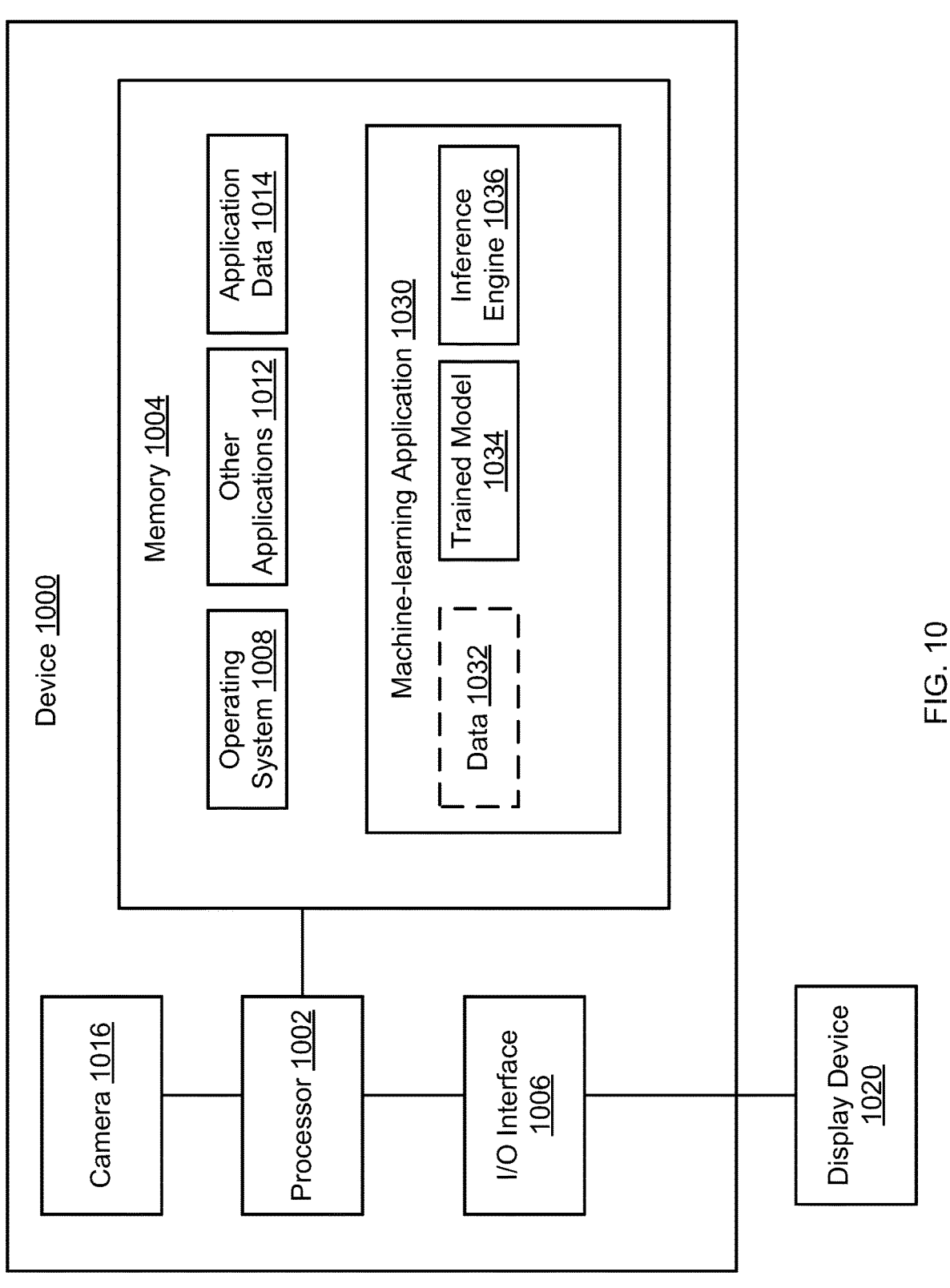
FIG. 10 is a block diagram of an example device, which may be used in some implementations described herein.

FIG. 10—Example Computing Device

FIG. 10 is a block diagram of an example device 1000 which may be used in some implementations described herein.

FIG. 10 is a block diagram of an example device 1000 which may be used to implement one or more features described herein. In one example, device 1000 may be used to implement a client device, e.g., any of client devices (920, 922, 924, 926) shown in FIG. 9. Alternatively, device 1000 can implement a server device, e.g., server device 904. In some implementations, device 1000 may be used to implement a client device, a server device, or both client and server devices. Device 1000 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1000 includes a processor 1002, a memory 1004, input/output (I/O) interface 1006, and camera 1016. Processor 1002 can be one or more processors and/or processing circuits to execute program code and control basic operations of the device 1000. A "processor" includes any suitable hardware system, mechanism or component that processes data, signals or other information. A processor may include a system with a general-purpose central processing unit (CPU) with one or more cores (e.g., in a single-core, dual-core, or multicore configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 1002 may include one or more co-processors that implement neural-network processing. In some implementations, processor 1002 may be a processor that processes data to produce probabilistic output, e.g., the output produced by processor 1002 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the device 1000 by the processor 1002, including an operating system 1008, machine-learning application 1030, other applications 1012, and application data 1014. Other applications 1012 may include applications such as a camera application, an image gallery or image library application, data display engine, web hosting engine, image display engine, notification engine, social networking engine, etc. In some implementations, the machine-learning application 1030 and other applications 1012 can each include instructions that enable processor 1002 to perform functions described herein, e.g., some or all of the methods of FIGS. 5A-5B, 6, and 8B.

Other applications 1012 can include, e.g., a camera application, an image library application, an image management application, an image gallery application, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1030 may utilize Bayesian classifiers, support vector machines, neural networks, or other learning techniques. In some implementations, machine-learning application 1030 may include a trained model 1034, an inference engine 1036, and data 1032. In some implementations, trained model 1034 may be a gating model and may include one or more models. For example, machine-learning application 1030 may be used for object boundary prediction as discussed herein.

In some implementations, data 1032 may include training data, e.g., data used to generate trained model 1034. For example, training data may include any type of data such as text, images, audio, video, etc. In some implementations, training data may include a training set comprising a plurality of training images and corresponding outputs (e.g., click sequences defining object boundaries). Training data may be obtained from any source, e.g., a data repository specifically marked for training, data for which permission is provided for use as training data for machine-learning, etc. In implementations where one or more users permit use of their respective user data to train a machine-learning model, e.g., trained model 1034, training data may include such user data. In implementations where users permit use of their respective user data, data 1032 may include permitted data such as images/videos or image/video metadata (e.g., videos, data regarding sharing of videos with other users, labels associated with videos, whether a video-based creation such as a video collage, a story, etc. was generated from a video, etc.), communications (e.g., e-mail; chat data such as text messages, voice, video, etc.), documents (e.g., spreadsheets, text documents, presentations, etc.) Data 1032 may specifically include images and outputs (e.g., click sequences) that define boundary information for objects.

In some implementations, training data may include synthetic data generated for the purpose of training, such as data that is not based on user input or activity in the context that is being trained, e.g., data generated from simulated or computer-generated videos, etc. In some implementations, machine-learning application 1030 excludes data 1032. For example, in these implementations, the trained model 1034 may be generated, e.g., on a different device, and be provided as part of machine-learning application 1030. In various implementations, the trained model 1034 may be provided as a data file that includes a model structure or form (e.g., that defines a number and type of neural network nodes, connectivity between nodes and organization of the nodes into a plurality of layers), and associated weights. Inference engine 1036 may read the data file for trained model 1034 and implement a neural network with node connectivity, layers, and weights based on the model structure or form specified in trained model 1034.

Machine-learning application 1030 also includes a trained model 1034. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1032 or application data 1014. Such data can include, for example, one or more pixels per node, e.g., when the trained model is used for analysis, e.g., of a picture that includes a plurality of objects having boundaries. Subsequent intermediate layers may receive as input, output of nodes of a previous layer per the connectivity specified in the model form or structure. These layers may also be referred to as hidden layers. A final layer (e.g., output layer) produces an output of the machine-learning application. For example, the output may be an indication of whether to programmatically analyze a video to add one or more annotations (e.g., a set of labels) to the video. In some implementations, model form or structure also specifies a number and/or type of nodes in each layer.

In different implementations, trained model 1034 can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc. For example, a heuristics-based model used in the gating model may store one or more previously generated indications corresponding to previous boundary coordinates from images.

In some implementations, trained model 1034 may include weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1032, to produce a result.

For example, training may include applying supervised learning techniques. In supervised learning, the training data can include a plurality of inputs (e.g., a set of overhead imagery) and a corresponding expected output for each input (e.g., coordinates/endpoints and corresponding labels for object boundaries). Based on a comparison of the output of the model with the expected output, values of the weights are automatically adjusted, e.g., in a manner that increases a probability that the model produces the expected output when provided with similar input.

In various implementations, a trained model includes a set of weights, or embeddings, corresponding to the model structure. In implementations where data 1032 is omitted, machine-learning application 1030 may include trained model 1034 that is based on prior training, e.g., by a developer of the machine-learning application 1030, by a third-party, etc. In some implementations, trained model 1034 may include a set of weights that are fixed, e.g., downloaded from a server that provides the weights.

Machine-learning application 1030 also includes an inference engine 1036. Inference engine 1036 is configured to apply the trained model 1034 to data, such as application data 1014 (e.g., overhead imagery), to provide an inference. In some implementations, inference engine 1036 may include software code to be executed by processor 1002. In some implementations, inference engine 1036 may specify circuit configuration (e.g., for a programmable processor, for a field programmable gate array (FPGA), etc.) enabling processor 1002 to apply the trained model. In some implementations, inference engine 1036 may include software instructions, hardware instructions, or a combination. In some implementations, inference engine 1036 may offer an application programming interface (API) that can be used by operating system 1008 and/or other applications 1012 to invoke inference engine 1036, e.g., to apply trained model 1034 to application data 1014 to generate an inference. For example, object boundary prediction may be an example type of inference.

Machine-learning application 1030 may provide several technical advantages in this context. Various implementations described herein have several technical benefits. Training the machine learning model to identify object boundaries can be performed using a representative training dataset that includes overhead imagery that captures different varieties (object type, object size, and other attributes) of objects, without having to manually encode rules or heuristics. Instead, by training the model using a set of images with corresponding manual annotations, the model is automatically configured to recognize object boundaries. Further, since pre-stored manual annotations (e.g., from previously annotated imagery) is reused, little or no computational resources are required to generate the training dataset.

Still further, in implementations where a pre-trained machine learning model (e.g., a picture to sequence model) is fine-tuned to train it to generate object boundaries from overhead imagery, the training dataset can be smaller, sufficient to adapt the model to the domain of annotating overhead imagery. With a smaller training dataset, the computational resources required for training the model are lower.

Further, once trained, the trained model can automatically generate object boundaries (or other annotations) for arbitrary overhead imagery. The trained model can also receive additional conditioning inputs (e.g., annotations for neighboring tiles, annotations for a prior version of the tile, etc.) that enable the model output to accurately identify object boundaries for any type of object. The model can be deployed as newer overhead imagery becomes available and can generate updated object boundaries that can be used to update a digital map, with little to no manual effort. Further, since each tile (or a set of adjacent tiles) can be analyzed by the model independent of other tiles, the ML model can process a large number of tiles in parallel, thus allowing efficient computation (e.g., using a GPU, a machine learning processor, or other special purpose processor) and rapid generation of results.

In some implementations, machine-learning application 1030 may be implemented in an offline manner. In these implementations, trained model 1034 may be generated in a first stage, and provided as part of machine-learning application 1030. In some implementations, machine-learning application 1030 may be implemented in an online manner. For example, in such implementations, an application that invokes machine-learning application 1030 (e.g., operating system 1008, one or more of other applications 1012, etc.) may utilize an inference produced by machine-learning application 1030, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 1034, e.g., to update embeddings for trained model 1034.

In some implementations, machine-learning application 1030 may be implemented in a manner that can adapt to particular configuration of device 1000 on which the machine-learning application 1030 is executed. For example, machine-learning application 1030 may determine a computational graph that utilizes available computational resources, e.g., processor 1002. For example, if machine-learning application 1030 is implemented as a distributed application on multiple devices, machine-learning application 1030 may determine computations to be carried out on individual devices in a manner that optimizes computation. In another example, machine-learning application 1030 may determine that processor 1002 includes a GPU with a particular number of GPU cores (e.g., 1000) and implement the inference engine accordingly (e.g., as 1000 individual processes or threads).

In some implementations, machine-learning application 1030 may implement an ensemble of trained models. For example, trained model 1034 may include a plurality of trained models that are each applicable to same input data. In these implementations, machine-learning application 1030 may choose a particular trained model, e.g., based on available computational resources, success rate with prior inferences, etc. In some implementations, machine-learning application 1030 may execute inference engine 1036 such that a plurality of trained models is applied. In these implementations, machine-learning application 1030 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1008 or one or more applications 1012.

For example, the machine learning model may be implemented as an ensemble of trained models, e.g., with different quality/performance tradeoffs.

In some implementations, machine-learning application 1030 may produce an output based on a format specified by an invoking application, e.g. operating system 1008 or one or more applications 1012. In some implementations, an invoking application may be another machine-learning application. For example, such configurations may be used in generative adversarial networks, where an invoking machine-learning application is trained using output from machine-learning application 1030 and vice-versa.

Any software in memory 1004 can alternatively be stored on any other suitable storage location or computer-readable medium. In addition, memory 1004 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the device 1000 with other systems and devices. Interfaced devices can be included as part of the device 1000 or can be separate and communicate with the device 1000. For example, network communication devices, storage devices (e.g., memory and/or database 906), and input/output devices can communicate via I/O interface 1006. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1006 can include one or more display devices 1020 that can be used to display content, e.g., images, video, and/or a user interface of an output application as described herein. Display device 1020 can be connected to device 1000 via local connections (e.g., display bus) and/or via networked connections and can be any suitable display device. Display device 1020 can include any suitable display device such as an LCD, LED, or plasma display screen, CRT, television, monitor, touchscreen, 3-D display screen, or other visual display device. For example, display device 1020 can be a flat display screen provided on a mobile device, multiple display screens provided in a goggles or headset device, or a monitor screen for a computer device.

The I/O interface 1006 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

Camera 1016 may be any type of camera that can capture a video that includes a plurality of frames or individual images. Camera as used herein can include any image capture device. In some implementations, camera 1016 may include a plurality of lenses that have different capabilities, e.g., front-facing vs. rear-facing, different zoom levels, image resolutions of captured images, etc. In some implementations, device 1000 may include one or more sensors, such as a depth sensor, an accelerometer, a location sensor (e.g., GPS), a gyroscope, etc. In some implementations, the one or more sensors may be operated together with the camera to obtain sensor readings corresponding to different frames of the video captured using the camera. For example, camera 1016 may be integrated into a satellite or an aerial vehicle and used to obtain overhead imagery of a scene.

For ease of illustration, FIG. 10 shows one block for each of processor 1002, memory 1004, I/O interface 1006, camera 1016, and software-related blocks 1008, 1012, and 1030. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While some components are described as performing blocks and operations as described in some implementations herein, any suitable component or combination of components of network environment 900, device 1000, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

In the above detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the figures, can be arranged, substituted, combined, separated, and designed in a wide variety of different configurations, all of which are contemplated herein.

References in the specification to "some implementations," "an implementation," "an example implementation," etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

We claim:

1. A computer-implemented method to use a trained machine learning (ML) model to identify object boundaries from overhead imagery, the method comprising:

obtaining overhead imagery that depicts a plurality of objects having at least one unknown object boundary;

generating, by the trained ML model, predicted sequences of user input actions associated with object boundaries of the plurality of objects in the overhead imagery; and determining the object boundaries of the plurality of objects based on the predicted sequences of user input actions.

2. The computer-implemented method of claim 1, wherein individual images in the overhead imagery correspond to tiles for a map, each tile with associated coordinates, and the computer-implemented method further comprising: stitching together at least two tiles to form a portion of the map.

3. The computer-implemented method of claim 2, wherein the tiles overlap or there are gaps between tiles, and wherein the stitching corrects for the overlap or the gaps.

4. The computer-implemented method of claim 2, further comprising identifying adjacent tiles based on the coordinates, and wherein stitching together two or more of the tiles comprises:

detecting whether there is at least one non-matching tile boundary between the adjacent tiles; and in response to detecting that there is at least one non-matching tile boundary between the adjacent tiles, performing at least one of:

generating the predicted sequences conditioned on individual tiles, generating the predicted sequences conditioned on a group of adjacent tiles, or flagging at least one tile of the adjacent tiles for review or update.

5. The computer-implemented method of claim 2, wherein stitching together the at least two tiles comprises applying heuristics to determine object boundaries for each tile of the at least two tiles.

6. The computer-implemented method of claim 2, wherein stitching together the at least two tiles comprises at least one of identifying holes in objects in a particular tile of the at least two tiles and identifying objects that span multiple tiles of the at least two tiles.

7. The computer-implemented method of claim 1, wherein at least one unknown object boundary is an object boundary having a respective confidence score less than a threshold value.

8. The computer-implemented method of claim 1, wherein the overhead imagery comprises at least one of objects with unknown boundaries or objects with approximated boundaries having a confidence score less than threshold value.

9. The computer-implemented method of claim 7, wherein the trained ML model outputs a sequence of object descriptions including coordinates of endpoints of boundary segments and class labels associated with portions of the objects that define the object boundaries.

10. The computer-implemented method of claim 1, wherein individual overhead images in the overhead imagery may be associated with an overhead imagery angle used to associate object boundaries with dimensionality greater than two-dimensional (2D) dimensionality.

11. The computer-implemented method of claim 1, wherein the trained ML model is trained by:

obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects;

generating for each sample, by the ML model and based on the overhead imagery, a set of predicted user input actions for the overhead image;

calculating, for each sample, a respective value of a loss function based on a comparison of the set of user input actions in the sample and the set of predicted user input actions; and updating one or more parameters of the ML model based on the values of the loss function.

12. A computer-implemented method to train a machine learning (ML) model to identify object boundaries from overhead imagery, the method comprising:

obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects;

generating for each sample, by the ML model and based on the overhead imagery, a set of predicted user input actions for the overhead image;

calculating, for each sample, a respective value of a loss function based on a comparison of the set of user input actions in the sample and the set of predicted user input actions; and updating one or more parameters of the ML model based on the values of the loss function.

13. The computer-implemented method of claim 12, wherein the ML model is a neural network and updating the one or more parameters of the ML model based on the values of the loss function comprises one or more of automatically adjusting a weight of one or nodes of the neural network or automatically adjusting connectivity between one or more pairs of nodes of the neural network.

14. The computer-implemented method of claim 12, wherein individual overhead images in the training dataset correspond to tiles for a map, each tile with associated coordinates, and wherein the tiles are stitched together to form the map.

15. The computer-implemented method of claim 12, wherein user input actions in the set of user input actions comprise clicks made by at least one user on individual overhead images in the training dataset and wherein one or more click locations associated with the clicks correspond to a point on the object boundaries.

16. A computing device comprising:

a processor; and a memory with instructions stored thereon that, when executed by the processor cause the processor to perform operations to identify object boundaries from overhead imagery using a trained machine learning (ML) model, the operations comprising:

obtaining overhead imagery showing a plurality of objects having at least one unknown object boundary;

predicting, by the trained ML model, predicted sequences of user input actions associated with object boundaries of the plurality of objects shown in the overhead imagery by processing the overhead imagery to generate corresponding sequences of user input actions; and determining the object boundaries of the plurality of objects based on the predicted sequences of user input actions.

17. The computing device of claim 16, wherein individual images in the overhead imagery correspond to tiles for a map, each tile with associated coordinates, and the operations further comprising: stitching together at least two tiles to form a portion of the map.

18. The computing device of claim 16, wherein the trained ML model outputs a sequence of object descriptions including coordinates of endpoints of boundary segments and class labels associated with portions of the objects that define the object boundaries.

19. The computing device of claim 16, wherein individual overhead images in the overhead imagery may be associated with an overhead imagery angle used to associate object boundaries with dimensionality greater than two-dimensional (2D) dimensionality.

20. The computing device of claim 16, wherein the trained ML model is trained by:

obtaining a training dataset including a plurality of samples that each include an overhead image of a respective scene including a plurality of objects and a respective set of user input actions that corresponds to the overhead image of the respective scene, wherein the user input actions are indicative of object boundaries of one or more of the plurality of objects;

generating for each sample, by the ML model and based on the overhead imagery, a set of predicted user input actions for the overhead image;

calculating, for each sample, a respective value of a loss function based on a comparison of the set of user input actions in the sample and the set of predicted user input actions; and updating one or more parameters of the ML model based on the values of the loss function.

* * * * *